(12) United States Patent
Hunt

(10) Patent No.: US 6,708,879 B2
(45) Date of Patent: Mar. 23, 2004

(54) AUTOMATED UNMANNED RENTAL SYSTEM AND METHOD

(75) Inventor: Douglas Harold Hunt, Redondo Beach, CA (US)

(73) Assignee: Audio Visual Services Corporation, Long Beach, CA (US)

(*) Notice: Subject to any disclaimer, the term of this patent is extended or adjusted under 35 U.S.C. 154(b) by 276 days.

(21) Appl. No.: 10/015,193

(22) Filed: Nov. 16, 2001

(65) Prior Publication Data

US 2003/0097304 A1 May 22, 2003

(51) Int. Cl.$^7$ ............................................. G06F 17/60
(52) U.S. Cl. ........................ 235/385; 235/381; 235/383
(58) Field of Search ............................... 235/385, 381, 235/382, 383, 375; 705/22, 28

(56) References Cited

U.S. PATENT DOCUMENTS

| | | | |
|---|---|---|---|
| 5,028,766 A | * | 7/1991 | Shah ........................... 235/381 |
| 5,708,423 A | | 1/1998 | Ghaffari et al. |
| 5,745,036 A | | 4/1998 | Clare |
| 5,917,407 A | * | 6/1999 | Squire et al. ............... 235/381 |
| 5,949,335 A | | 9/1999 | Maynard |
| 5,963,134 A | | 10/1999 | Bowers et al. |
| 6,010,239 A | | 1/2000 | Hardgrave et al. |
| 6,025,780 A | | 2/2000 | Bowers et al. |
| 6,078,251 A | | 6/2000 | Landt et al. |
| 6,102,162 A | | 8/2000 | Teicher |
| 6,104,333 A | | 8/2000 | Wood, Jr. |
| 6,154,006 A | * | 11/2000 | Hatanaka et al. ........... 320/109 |
| 6,384,717 B1 | * | 5/2002 | DeVolpi ..................... 340/432 |
| 2002/0022979 A1 | * | 2/2002 | Whipp et al. ................. 705/5 |

FOREIGN PATENT DOCUMENTS

JP 10293874 A * 11/1998 ............. G07F/7/08

* cited by examiner

Primary Examiner—Thien M. Le
Assistant Examiner—Uyen-Chau N. Le
(74) Attorney, Agent, or Firm—Gibson, Dunn & Crutcher LLP; Stanley J. Gradisar

(57) ABSTRACT

An automated unmanned rental system enables the automatic tracking of rental activity and equipment movement. Each unmanned rental site has a computer system that monitors rental activity and monitors the available inventory and the rented, or checked out, inventory, and automatically generates invoices for items rented. The computer system controls an RFID tracking system that utilizes the RFID tags on each piece of audio visual equipment in cooperation with one or more antennas. The antennas send and receive signals that interact with the RFID tags when the equipment containing the RFID tag passes through a portal. The computer system has a user interface to allow for associating equipment rental activity with a user and a reference document. A reporting module may automatically communicate equipment movements. A security alarm module may trigger an audible alarm under defined circumstances.

101 Claims, 13 Drawing Sheets

AUTOMATED UNMANNED RENTAL SYSTEM AND METHOD

FIELD OF THE INVENTION

This invention relates to rental systems and methods, and more particularly, to an automated unmanned rental system and method.

DETAILED DESCRIPTION OF THE INVENTION

Figure 1:
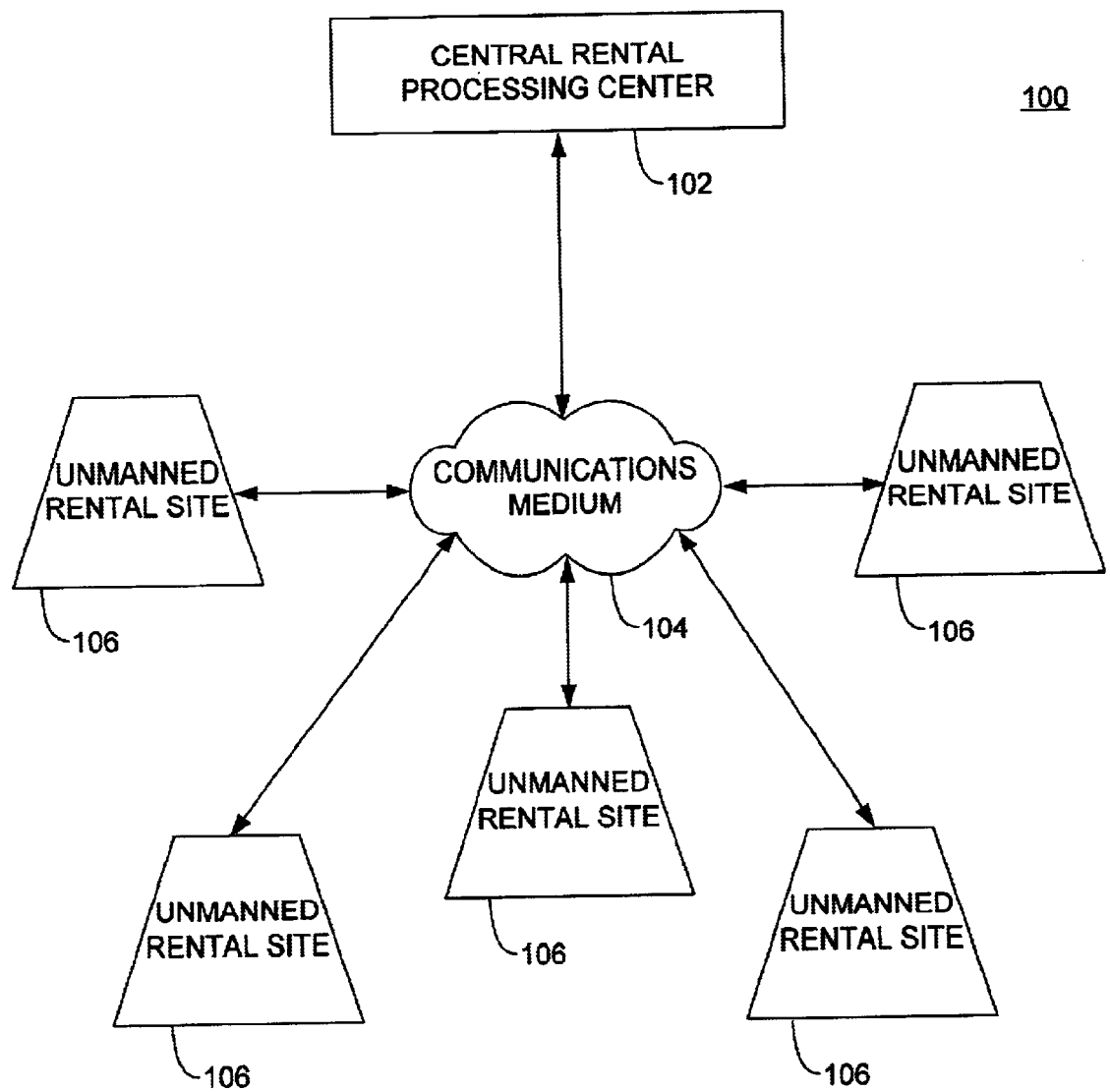
FIG. 1 shows a schematic/block diagram of an embodiment of an automated unmanned rental system of the present invention.

FIG. 1 shows a schematic/block diagram of an embodiment of an automated unmanned rental system of the present invention. Referring now to FIG. 1, Automated Unmanned Rental System 100 enables the automatic tracking of rental activity and equipment movement. Automated Unmanned Rental System 100 has a Central Rental Processing Center 102 which is in communication with a number of individual Unmanned Rental Sites 106 through Communications Medium 104. There could be tens or hundreds of Unmanned Rental Sites 106, but only five are shown in FIG. 1 for simplicity. Each Unmanned Rental Site 106 may be geographically located within the same structure, such as a building, within the same city in different buildings or structures, within the same state, within a multiple number of states, or in a number of different countries around the world. Communications Medium 104 may be the Internet, an intranet, a LAN, a WAN, a wireless communication network, a satellite communication network, or any other suitable communications medium. In one embodiment of the invention, Communications Medium 104 is the Internet, and each Unmanned Rental Site 106 from their different geographic locations are capable of accessing Communications Medium 104, and capable of being accessed by Communications Medium 104, through the Internet.

In another embodiment of the invention, there may be several Central Rental Processing Centers 102 in various geographic regions. For example, each state in the country may have a Central Rental Processing Center 102 having various Unmanned Rental Sites 106 located throughout the state that report to it. Or, several states may be combined into a region with one Central Rental Processing Center 102 responsible for all the Unmanned Rental Sites 106 within the region.

In another embodiment of the Automated Unmanned Rental System 100 of the present invention, each Unmanned Rental Site 106 is self contained and does not need to nor does it communicate with Central Rental Processing Center 102 through Communications Medium 104. Automated Unmanned Rental System 100 is applicable to many different industries that incorporate rental activity in their business. Such industries include, but are not limited to, the hotel industry, the construction industry, the medical industry, and any other industry where Radio Frequency Identification (RFID) tags may be affixed to the rental equipment.

In the construction industry, a tool crib may be established at a construction site by an outside vendor. Typically, an employee of the outside vendor mans the tool crib, checking out pieces of equipment to workers, and checking them back in. Unless the construction project is extremely large, resulting in fairly heavy usage of the tool crib, manning the tool crib with an employee is very expensive. For smaller construction projects, the tool crib may only be manned for short periods of time throughout the day, which may reduce labor costs, but also has the potential to slow down work on the project for lack of tools when needed. Some construction companies have attempted to operate a tool crib on an honor system, expecting each worker to fill out a check-out sheet for equipment used, and to cross the item off when it is returned. This approach has usually met with little success, due to the nature of the workers and the time constraints and job pressures they work under.

Similarly, in the medical industry, an outside vendor may place various pieces of medical equipment in a manned or unmanned storage room in a medical facility. A manned facility is very expensive, and an unmanned facility, relying on the medical facility employees to follow proper procedure, results in the same types of problems discussed above.

In the hotel industry, especially those hotels that cater to businesses for meetings and events, audio visual equipment may be supplied to the hotel by a third party on a consignment basis. This equipment is typically stored in a storage area accessible by authorized hotel personnel. As hotel clientele request meeting and banquet rooms and supporting audio visual services, hotel personnel retrieve the equipment needed from the storage area and set it up in the required meeting room or banquet hall. For each such use, the hotel employee is supposed to notify the third party provider or fill out a rental form and submit the rental form to the third party provider, who in turn bills the hotel for the rental of the equipment. The hotel in turn will in most cases bill the guest or business client who requested the audio visual equipment in the first place.

The inherent and obvious difficulty with this process is that it relies completely on the honesty and reliability of the hotel staff. In situations like this, many uses of the audio visual equipment go undocumented because hotel personnel are too busy to fill out the proper paperwork or are just dishonest. Oftentimes, the hotel employees handling this task are low level employees who may not be motivated, interested, or do not have the time, desire, or honesty to follow the established rental procedures. For most hotels providing audio visual services to its clientele, the third party provider cannot cost justify placing one of its employees in a small to medium sized hotel to capture all the rental transactions. Thus, the third party provider loses out on many legitimate dollars of rental income each year.

In one embodiment of the invention, the rental activity from each Unmanned Rental Site 106 is reported to Central Rental Processing Center 102 on a periodic basis. Each Unmanned Rental Site 106 has a computer system that monitors rental activity and monitors the available inventory list and tracks the rented, or checked out, inventory and may automatically generate invoices for items rented. Invoices are typically generated upon the return of the equipment, but could also be generated at other times. The automated invoices may be sent to the client at each Unmanned Rental Site 106 and posted to an accounting system resident on a computer system located in Central Rental Processing Center 102. Exception reports generated in each Unmanned Rental Site 106 are also uploaded to Central Rental Processing Center 102 for analysis and action.

Figure 2:
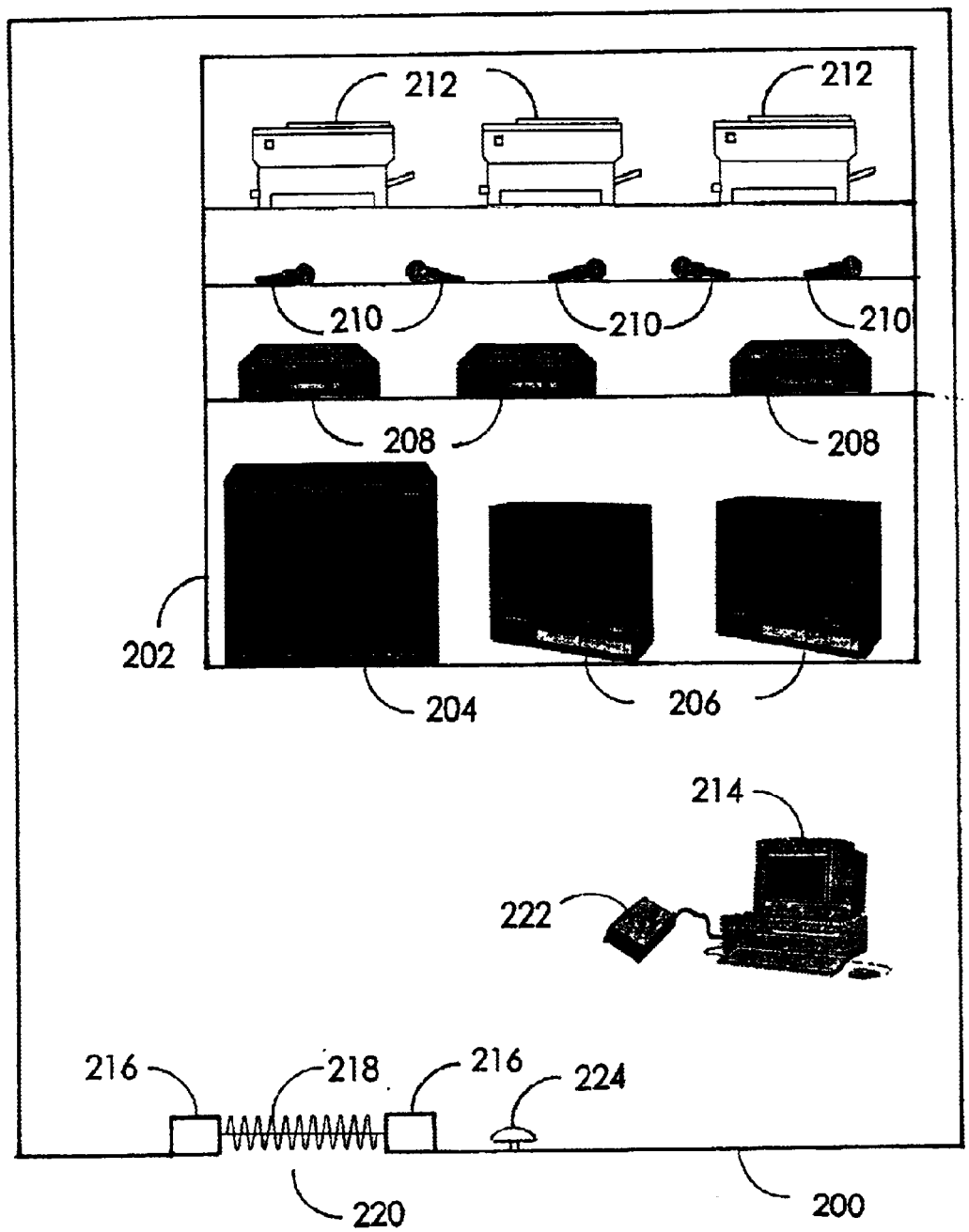
FIG. 2 shows a schematic layout diagram of an embodiment of an automated unmanned rental station located at an unmanned rental site of the present invention with application in the hotel industry.

FIG. 2 shows a schematic layout diagram of an embodiment of an automated unmanned rental station located at an unmanned rental site of the present invention with application in the hotel industry. Referring now to FIG. 2, Automated Unmanned Rental Station 200, which may be a storage room or some type of secure space, is located in a hotel. The audio visual equipment stored in Automated Unmanned Rental Station 200 may be owned by a third party who has a contractual relationship with the hotel to supply audio visual equipment for use by the hotel staff or clientele of the hotel. The hotel may choose to store other items along with the audio visual equipment in Automated Unmanned Rental Station 200.

Typically, Storage Shelves 202 provide a safe and convenient way to store the audio visual equipment when not in use. Typical of the kinds of audio visual equipment made available to the hotel by the third party include, but are not limited to, Large Screen Television 204, Television Monitors 206, VCRs 208, Microphones 210, and Overhead Projectors 212. Other types of audio visual equipment not shown include, but are not limited to, movie projectors and screens, portable public address systems, clip on microphones, slide projectors, video projectors, flip charts, etc. Each of the primary pieces of audio visual equipment has an RFID tag affixed thereto (not shown).

Computer System 214, more fully described below in the discussion of FIG. 3, controls an RFID tracking system that utilizes the RFID tags on each piece of audio visual equipment in cooperation with Antennas 216. Antennas 216 send and receive Signals 218 that interact with the RFID tags when the equipment containing the RFID tag passes through Portal 220. In one embodiment of the invention, a passive RFID system is used. One skilled in the art will recognize that an active RFID system could also be used.

Portal 220 may be a doorway, a gate, or a pass through opening. Antennas 216 may be any of the common types well known in the art. Antennas 216 may be located in a number of different positions around Portal 220 depending upon their type and the dimensions of Portal 220. Typically, for a doorway such as Portal 220, at least one Antenna 216 is located above Portal 220 (not shown in FIG. 2), and at least one Antenna 216 is located parallel to Portal 220 as is well known in the art. Depending upon the size and shape of Portal 220, one or more Antennas 216 are deployed in such a way as to provide complete coverage to Portal 220.

Each RFID tag contains unique data embedded in the passive RFID tag. As each piece of audio visual equipment having an RFID tag passes through Portal 220, the antenna powers the passive RFID tag, and the unique data contained in the passive RFID tag is emitted in a signal that is received by the antenna and transferred to Computer System 214. The transfer may be accomplished through a wired or wireless connection (not shown in FIG. 2) to Computer System 214. Computer System 214 interprets the signal, extracting the unique data. In one embodiment, the unique data embedded in the passive RFID tag includes a twelve digit number plus additional data written onto the tag. Computer System 214 then compares the number to an inventory database stored in Computer System 214 that maps each unique twelve digit number to each piece of audio visual equipment. The inventory database contains pertinent information in various database fields on each piece of audio visual equipment with the passive RFID tag that is assigned to this particular Unmanned Rental Site 106. Such information may include, but is not limited to, generic name for the piece of audio visual equipment, manufacturer, model number, serial number, color, dimensions, weight, date of acquisition, the vendor the piece of audio visual equipment was purchased from, repair and maintenance information, number of times rented, dates of past rentals, rental rate, barcode number, etc.

Computer System 214 has a user interface to allow for associating equipment rental activity with a user and a reference document. The user in this embodiment is an authorized hotel employee. The user interface may be through a keyboard, a mouse, a voice command interpreted through speech recognition, a barcode reader such as a barcode wand, a touch screen of a graphics display, or any other suitable user interface. The user interface may also consist of any combination of two or more of the above mentioned interfaces.

Computer System 214 also employs a user identification process, which may be implemented in a number of different ways depending upon the requirements of the application. The user identification process may include, but is not limited to, facial recognition, retinal scan, palm scan, fingerprint reader, RFID tag issued to authorized personnel, password protection, swipe card, standard key, etc., or a combination of two or more of these options. Shown in FIG. 2 is User Identification Device 222, which may be a card reader or other suitable device associated with one of the above mentioned user identification processes.

The equipment rental software running on Computer System 214 establishes the business parameters of the processes used based on the application. A reporting hardware/software component may automatically communicate equipment movements to hotel contact personnel and to Central Rental Processing Center 102 (FIG. 1). An automated billing software component may create invoices from the daily activity data captured by Computer System 214. This information may be transmitted to both the hotel contact personnel and Central Rental Processing Center 102. The invoices may also be printed out on paper and mailed to the hotel contact personnel. A security alarm software component may trigger an audible alarm under defined circumstances, such as a piece of audio visual equipment being removed from Automated Unmanned Rental Station 200 by an unauthorized individual. The audible alarm may sound through the built in speaker in Computer System 214, or through an external Alarm 224 as shown in FIG. 2.

When one or more pieces of audio visual equipment are needed, a hotel employee (authorized user) enters Automated Unmanned Rental Station 200 and logs onto the Computer System 214 utilizing the user identification process. In the embodiment shown in FIG. 2, the authorized user would access User Identification Device 222 in a manner appropriate for the device. For example, if User Identification Device 222 is a card reader, the authorized user would swipe an access card across User Identification Device 222. The authorized user then enters a reference number into the system utilizing the user interface. In one embodiment, the monitor of Computer System 214 has a touch sensitive display screen for user input. The reference number in this embodiment may be a banquet equipment order (BEO) for a hotel client. In other embodiments the reference number may be a job number, rental order number, purchase order number, tool crib request number, etc. The authorized user then enters the estimated number of days the equipment is to be used. Upon successfully entering the above information, the alarm system is turned off and an indication is given to the authorized user that it is okay to remove equipment from Automated Unmanned Rental Station 200.

The authorized user then moves the equipment needed through Portal 220. The RFID tracking system receives the signal from the RFID tag on each piece of audio visual equipment moved through Portal 220. The equipment rental software interprets the received signal to acquire the unique data embedded on the RFID tag, and accesses the information stored in the inventory database for the piece of the audio visual equipment associated with the unique data. This information, along with the reference number, a date/time stamp, and the user who moved the equipment, is used to create a rental transaction record.

The current and any subsequent rental transactions may be automatically transmitted to the hotel contact personnel and/or Central Rental Processing Center 102 upon each occurrence, or in a batch at a specified time each day, or on one or more specified days of each week or month, via Communications Medium 104. Various reports may also be transmitted including, but not limited to, inventory status, equipment rental charges, reference numbers, identities of authorized users removing and returning equipment, and date and time the equipment was removed or returned to Automated Unmanned Rental Station 200.

Should equipment be moved through Portal 220 without proper process, then the alarm system would sound an audible alarm through Alarm 224, and the equipment rental software would immediately download data in an exception report to the hotel contact personnel or Central Rental Processing Center 102 or both via an e-mail or a facsimile transmission. The equipment rental software may also issue a digital pager message or cellular telephone text message to one or more designated individuals, such as security personnel or other management personnel. Exception reports may also be issued if equipment is not returned by the time indicated when checked out, or when an RFID signal is not recognized, as well as when equipment is removed or returned without proper authorization.

The equipment rental software may also transmit daily inventory information to the hotel contact personnel. When requests for audio visual equipment come in throughout the day the hotel contact personnel can know whether or not they can fulfill the request.

At Central Rental Processing Center 102 (FIG. 1), the automated invoices are posted to an accounting software system, and invoices may be e-mailed, faxed, or printed and mailed, to the hotels if not already done so by each Unmanned Rental Site 106. Personnel at Central Rental Processing Center 102 may also review generated e-mails and exception reports generated to help resolve any problems. Telephone calls may be made to those hotel contact personnel who have outstanding equipment or who have had alarm notifications or exception reports. Examples of exception reports include unauthorized removal or return of equipment, equipment not recognized by its RFID unique data, and equipment that is not returned by the date indicated that it was supposed to be returned when it was originally checked out. A single individual at Central Rental Processing Center 102 may manage a significant number of Unmanned Rental Sites 106 with a high dollar volume of sales at a very low cost.

Figure 3:
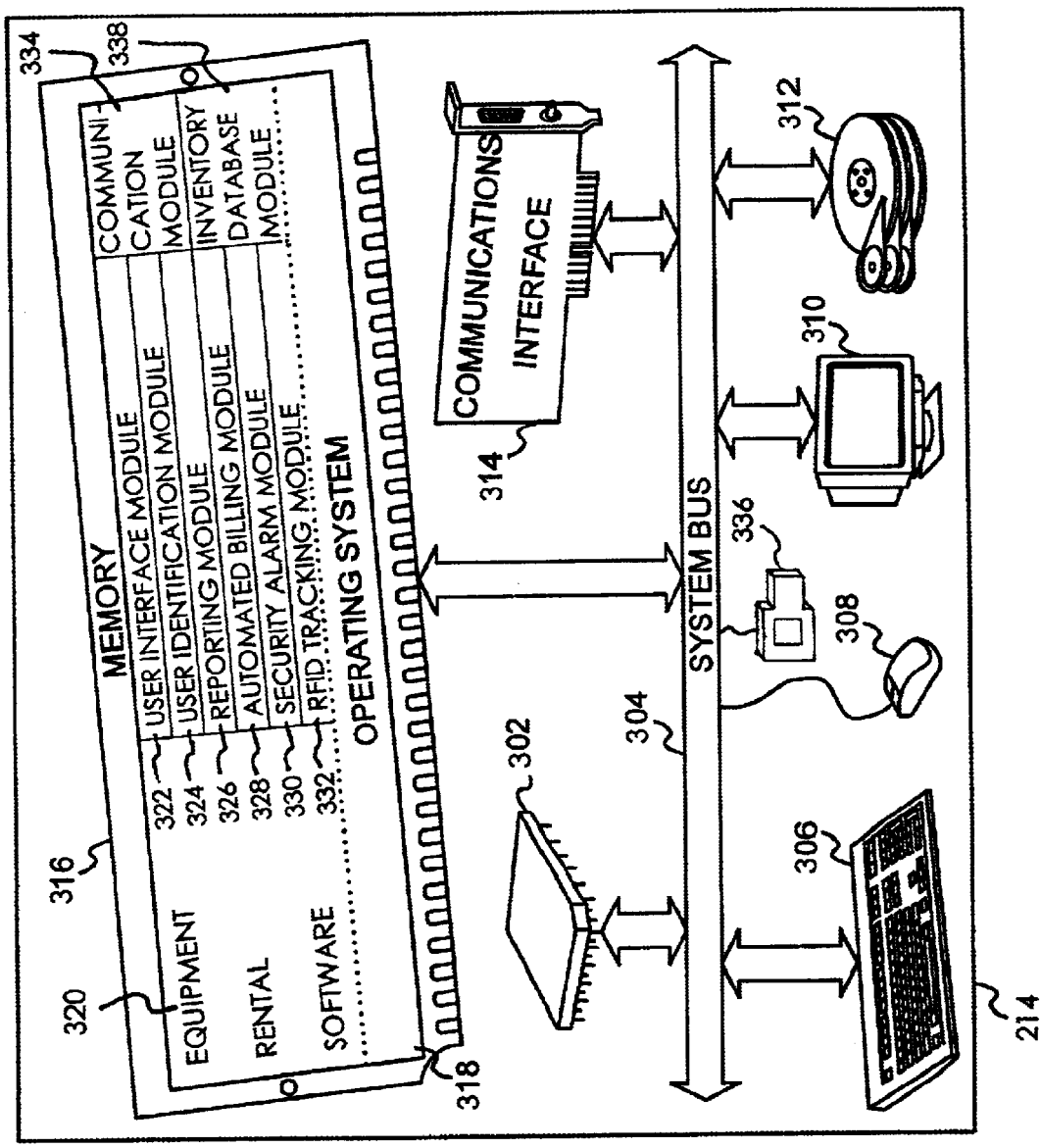
FIG. 3 shows a schematic/block diagram of the computer system of FIG. 2.

FIG. 3 shows a schematic/block diagram of the computer system of FIG. 2. The computer system may be a mainframe computer system, a stand alone personal computer system, or a networked distributed computer system. The computer system shown in FIG. 3 is an exemplary embodiment.

Referring now to FIG. 3, Computer System 214 contains a Processing Element 302. The Processing Element 302 communicates to other elements of the Computer System 214 over a System Bus 304. A Keyboard 306 allows a user to input information into Computer System 214, and a Graphics Display 310 allows Computer System 214 to output information to the user. Graphics Display 310 may also have a touch sensitive display screen, allowing a user to input information into Computer System 214 through the touch screen of the graphics display. A pointing device, such as Mouse 308, is also used to input information. A Storage Device 312 is used to store data and programs within Computer System 214.

A Memory 316, also attached to System Bus 304, contains an Operating System 318, and Equipment Rental Software 320, which may have various modules such as, but not limited to, User Interface Module 322, User Identification Module 324, Reporting Module 326, Automated Billing Module 328, Security Alarm Module 330, RFID Tracking Module 332, Communication Module 334, and Inventory Database Module 338.

User Interface Module 322 controls the interaction between the user and Equipment Rental Software 320. User Identification Module 324 controls the interaction between the identification hardware devices, such as User Identification Device 222, and Equipment Rental Software 320. Valid user identification input translates to a User ID Number that is unique for each authorized user. The User ID Number is associated with the rental transaction. Reporting Module 326 outputs reports regarding equipment rental activity, such as inventory status, equipment rental charges, reference numbers, identities of authorized users removing and returning equipment, and date and time the equipment was removed or returned. Automated Billing Module 328 may create invoices from the daily equipment rental activity. Security Alarm Module 330 controls the Alarm 224. RFID Tracking Module 332 interprets the signals received from the Antennas 216 for input to Equipment Rental Software 320.

Communications Module 334 controls Communications Interface 314, which is also attached to System Bus 304. Communications Interface 314 may have one or more serial ports, parallel ports, infrared ports, and the like. Connectable through Communications Interface 314 is User Identification Device 222, Alarm 224, and Antennas 216 (not shown in FIG. 3). Also connectable through Communications Interface 314 may be an external printer or scanner, as well as access to a computer network or to the Internet (not shown in FIG. 3). A security device may also be connected to System Bus 304, such as ID Security Device 336. ID Security Device 336 may be a biometric device, a camera, a fingerprint or hand reader, a swipe card reader, or any other suitable security device.

Figure 4A:
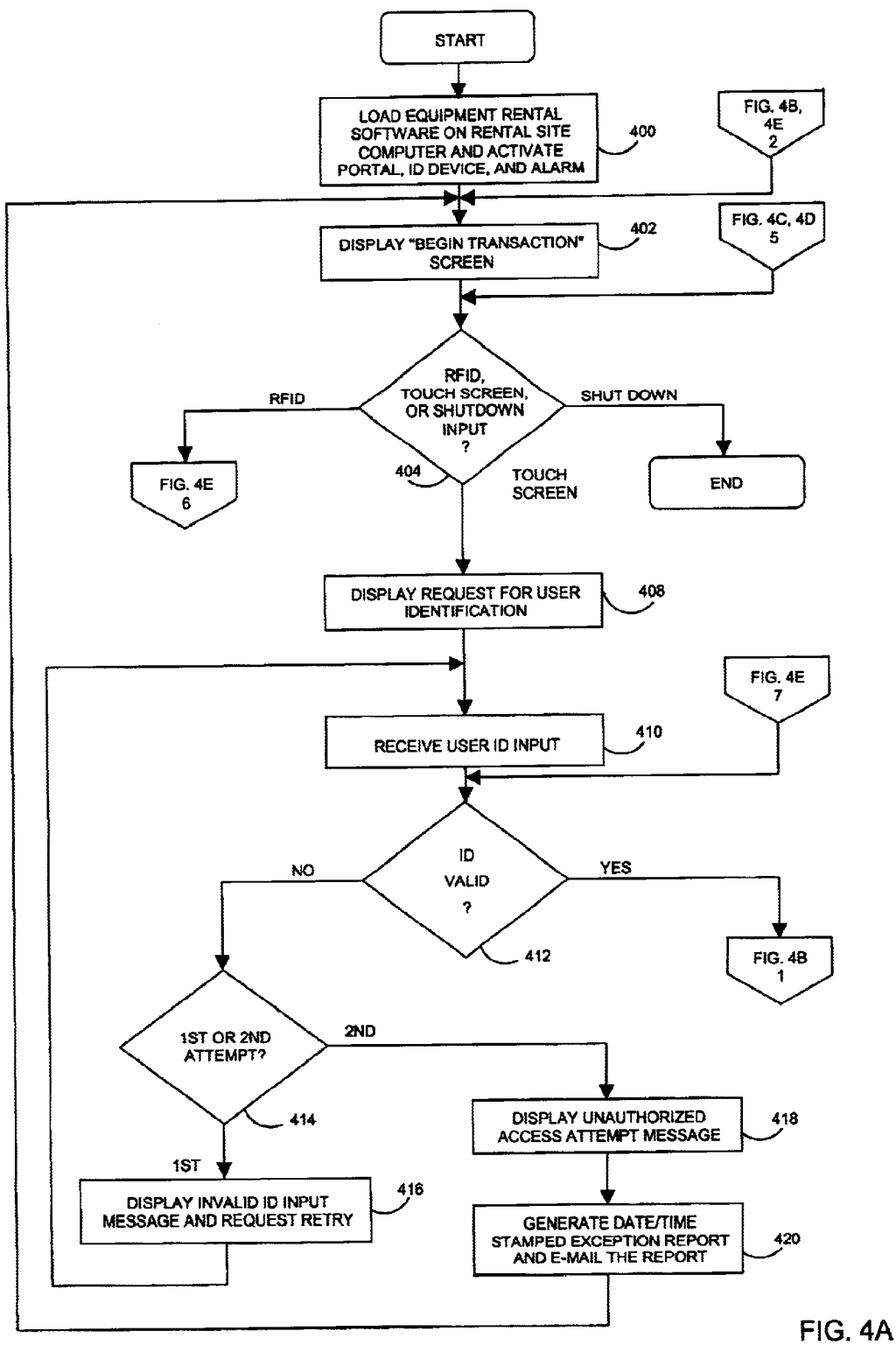
FIGS. 4A through 4G together form a flow chart that shows a method of an embodiment of a computer system at an automated unmanned rental station of an automated unmanned rental system of the present invention.

FIGS. 4A through 4G together form a flow chart that shows a method of an embodiment of a computer system at an automated unmanned rental station of an automated unmanned rental system of the present invention. Referring now to FIG. 4A, in step 400 Equipment Rental Software 320 (FIG. 3) is loaded onto Computer System 214 in Automated Unmanned Rental Station 200 (FIG. 2). Upon loading, the various modules of Equipment Rental Software 320 activate the various systems and hardware, including the RFID tracking system, the security alarm system, the identification system, etc. The third party provider has prior to this time stocked Automated Unmanned Rental Station 200 with various pieces of audio visual equipment as shown in FIG. 2, each equipped with an RFID tag. Inventory Database Module 338 contains the information corresponding to each unique data derived from each RFID tagged piece of equipment located in Automated Unmanned Rental Station 200. Inventory Database Module 338 stores in an organized and structured fashion the individual data elements entered by the users, the system administrators, and by the interaction of the hardware and software as RFID tags are passed through the portal. The data is organized to allow Equipment Rental Software 320 to store when RFID tags are passed through the portal, and then allow Equipment Rental Software 320 to calculate the time period between RFID reads. The structure of the data also facilitates the generation of reports by Reporting Module 326, by allowing specific individual data elements to be referenced.

In step 402 the User Interface Module 322 displays a "Begin Transaction" screen on Graphics Display 310 (FIG. 3). Graphics Display 310 in one embodiment of the invention has a touch sensitive display screen allowing for user input through the touch screen.

In determination step 404, Equipment Rental Software 320 determines if one of three types of input is received. If RFID input from the RFID tracking system is received, then control flows to step 482 of FIG. 4E, which is discussed below. If user input for shut down is received, then Equipment Rental Software 320 shuts down and the method of the present invention ends. If touch screen input to begin is received, then in step 408 a request for user identification is displayed on Graphics Display 310. In step 410, user identification input is received via User Identification Device 222, which is translated into a User ID Number. As mentioned earlier, other user identification devices may send input in step 410. Step 412 determines if the identification input is valid. If the identification input is not valid, then step 414 determines if this is the first or second attempt at identification input. If it is the first attempt, then in step 416 a message is displayed on Graphics Display 310 indicating that the identification input received was invalid, and requests that the user try again. Control then returns to step 410 to receive the next user identification input. If step 414 determines that this is the second failed attempt at identification input, then in step 418 an unauthorized access attempt message is displayed on Graphics Display 310. In step 420 Equipment Rental Software 320 generates a date and time stamped exception report and automatically e-mails the exception report to the hotel contact personnel at the Unmanned Rental Site 106 and to Central Rental Processing Center 102. Control then returns to step 402 where User Interface Module 322 displays the "Begin Transaction" screen on Graphics Display 310.

Figure 4B:
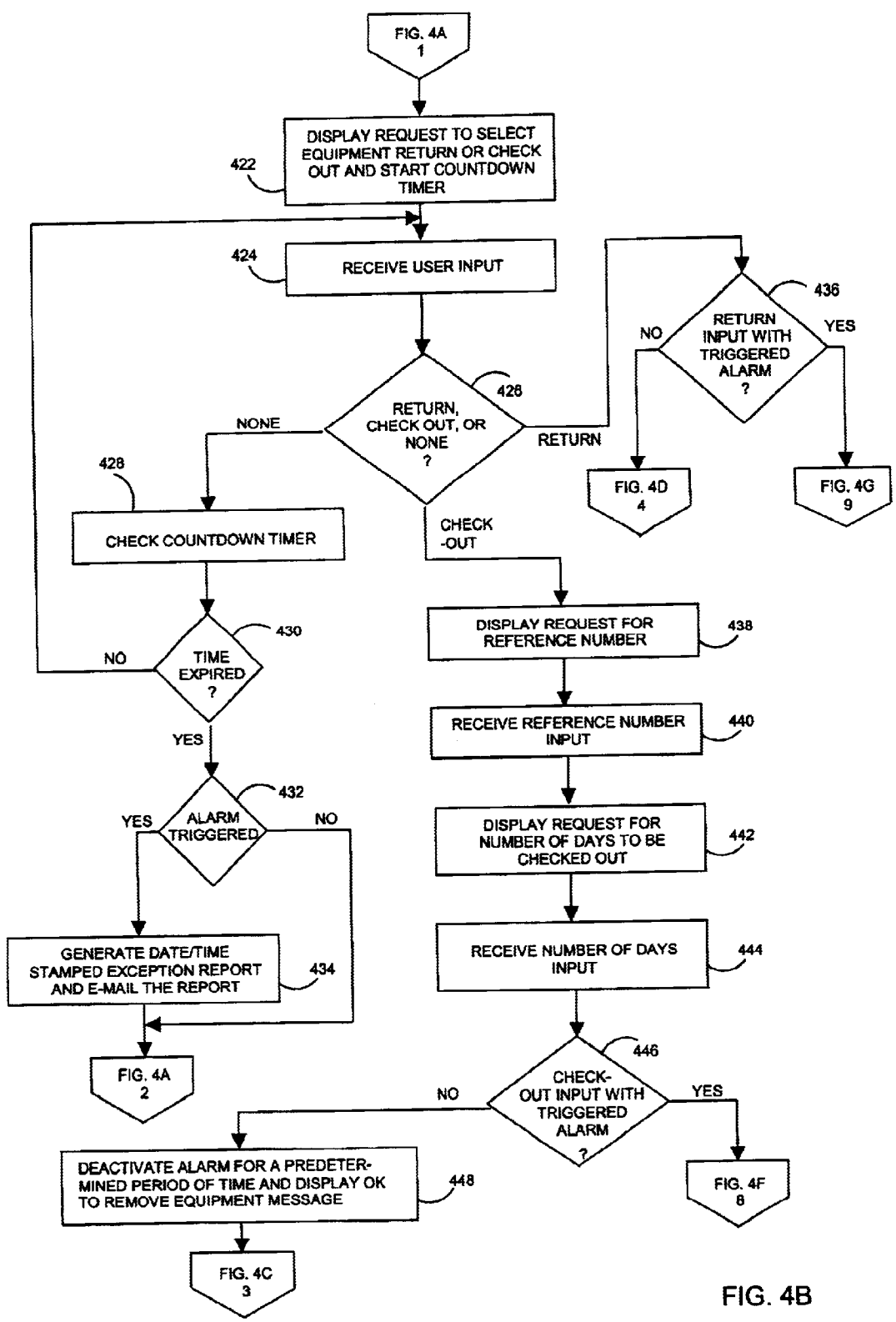

If step 412 determines that the identification input received in step 410 is valid, then control flows to step 422 of FIG. 4B. Step 412 is typical of a check step of user input. For the most part in the rest of the flow chart of FIGS. 4A–4G, check steps are omitted for the sake of simplicity. One skilled in the art will recognize that the use of check steps for user input is well known in the art and would be used wherever appropriate in Equipment Rental Software 320.

Referring now to FIG. 4B, in step 422, which flows from step 412 of FIG. 4A, a message is displayed on Graphics Display 310 requesting the user to select "Logon", "Return Equipment", "Check-Out Equipment", "Edit Transaction", "Logoff", or "Reboot." The "Logon", "Edit Transaction", "Logoff", and "Reboot" options are not shown in FIG. 4B. The "Logon", "Logoff", and "Reboot" options are well known in the art. The "Edit Transaction" option, also not shown, allows the user to add or change information to a previously entered transaction.

After the select option message is displayed, in step 422 a countdown timer is started for a predetermined period of time during which the user is allowed to respond. Typically, this predetermined period of time is between three to ten minutes, and may be adjusted in system set up. User input may be received in step 424. Step 426 determines if user input was received, and if so, if the user input was "Logon", "Return Equipment", "Check-Out Equipment", "Edit Transaction", "Logoff", or "Reboot." If step 426 determines that no user input has been received, then step 428 checks the countdown timer. Step 430 compares the countdown timer to the predetermined period of time allowed for user response. If step 430 determines that time has not expired, control returns to step 424 to receive user input. If step 430 determines that time has expired, then step 432 checks to see if the alarm has been triggered and is currently sounding. Such a situation arises when RFID input is received in step 404 and control flows to FIG. 4E, then returns to FIG. 4A at step 412, and then flows to FIG. 4B. This is further explained in the discussion of FIG. 4E below.

If the alarm has not been triggered, then control flows to step 402 of FIG. 4A, where User Interface Module 322 displays the "Begin Transaction" screen on Graphics Display 310. If step 432 determines that the alarm has been triggered, then in step 434 Equipment Rental Software 320 generates a date and time stamped exception report and automatically e-mails the exception report to the hotel contact personnel at the Unmanned Rental Site 106 and to Central Rental Processing Center 102. Control then also flows to step 402 of FIG. 4A.

If step 426 determines that "Return Equipment" input was received in step 424, then step 436 checks to see if the alarm has been triggered and is currently sounding. Such a situation arises when RFID input is received in step 404 and control flows to FIG. 4E, then returns to FIG. 4A at step 412, and then flows to FIG. 4B. This is further explained in the discussion of FIG. 4E below.

If the alarm was not triggered when the "Return Equipment" input was received, which is the case when touch screen input is received in step 404, then control flows to step 464 of FIG. 4D which is discussed below. If step 436 determines that the alarm was triggered when the "Return Equipment" input was received, then control flows to step 516 of FIG. 4G, which is discussed below.

If step 426 determines that "Check-Out Equipment" input was received in step 424, then in step 438 a request for input of a reference number message is displayed on Graphics Display 310. Step 440 receives the reference number input.

The user may enter more than one reference number if the user is removing equipment for more than one client. A check step for the validity of the reference number user input(s) is not shown in FIG. 4B.

In step 442, a message requesting input of the number of days the equipment is to be checked out is displayed on Graphics Display 310. Step 444 receives the number of days input. A check step for the validity of the number of days user input is not shown in FIG. 4B.

Step 446 checks to see if the alarm has been triggered and is currently sounding. Such a situation arises when RFID input is received in step 404 and control flows to FIG. 4E, then returns to FIG. 4A at step 412, and then flows to FIG. 4B. This is further explained in the discussion of FIG. 4E below.

If the alarm was triggered when the "Check-Out Equipment" input was received, then control flows to step 502 of FIG. 4F which is discussed below. If step 446 determines that the alarm was not triggered when the "Check-Out Equipment" input was received, which is the case when touch screen input is received in step 404, then in step 448 the alarm system is deactivated for a predetermined period of time to allow the authorized user to remove audio visual equipment from Automated Unmanned Rental Station 200. Typically this predetermined period of time is between three to ten minutes, and is adjustable in system set up. An okay to remove equipment message is displayed on Graphics Display 310. Control then flows to step 450 of FIG. 4C.

If step 426 determines that "Edit Transaction" input was received in step 424 (not shown in FIG. 4B), then a list of the most recent transactions are displayed on Graphics Display 310. The user may then scroll down the list and select the transaction to be edited, make additions or changes, and save the transaction. The user may then logoff of the system or access any of the other functions of the system available at that point.

Figure 4C:
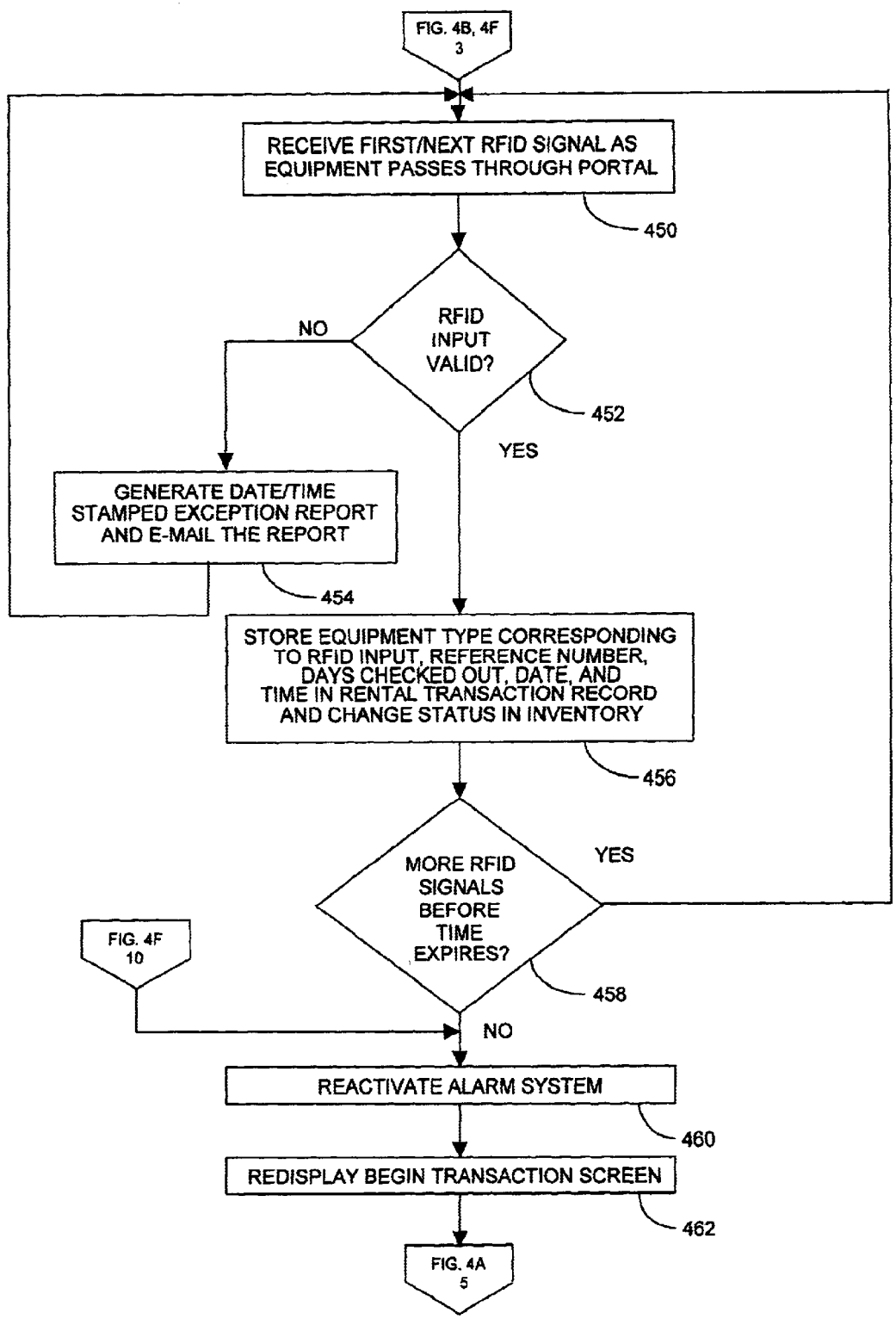
Figure 4D:
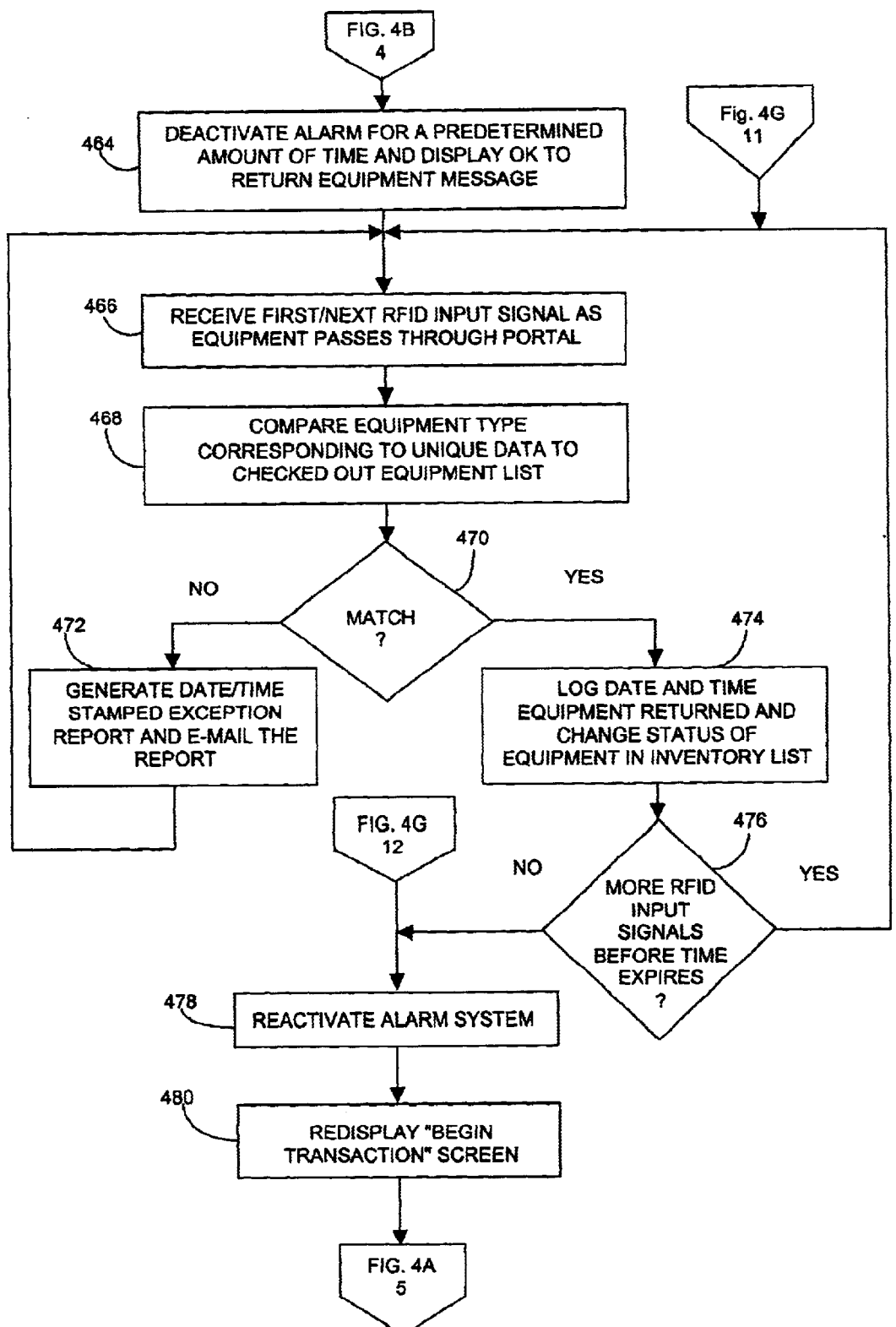
Figure 4E:
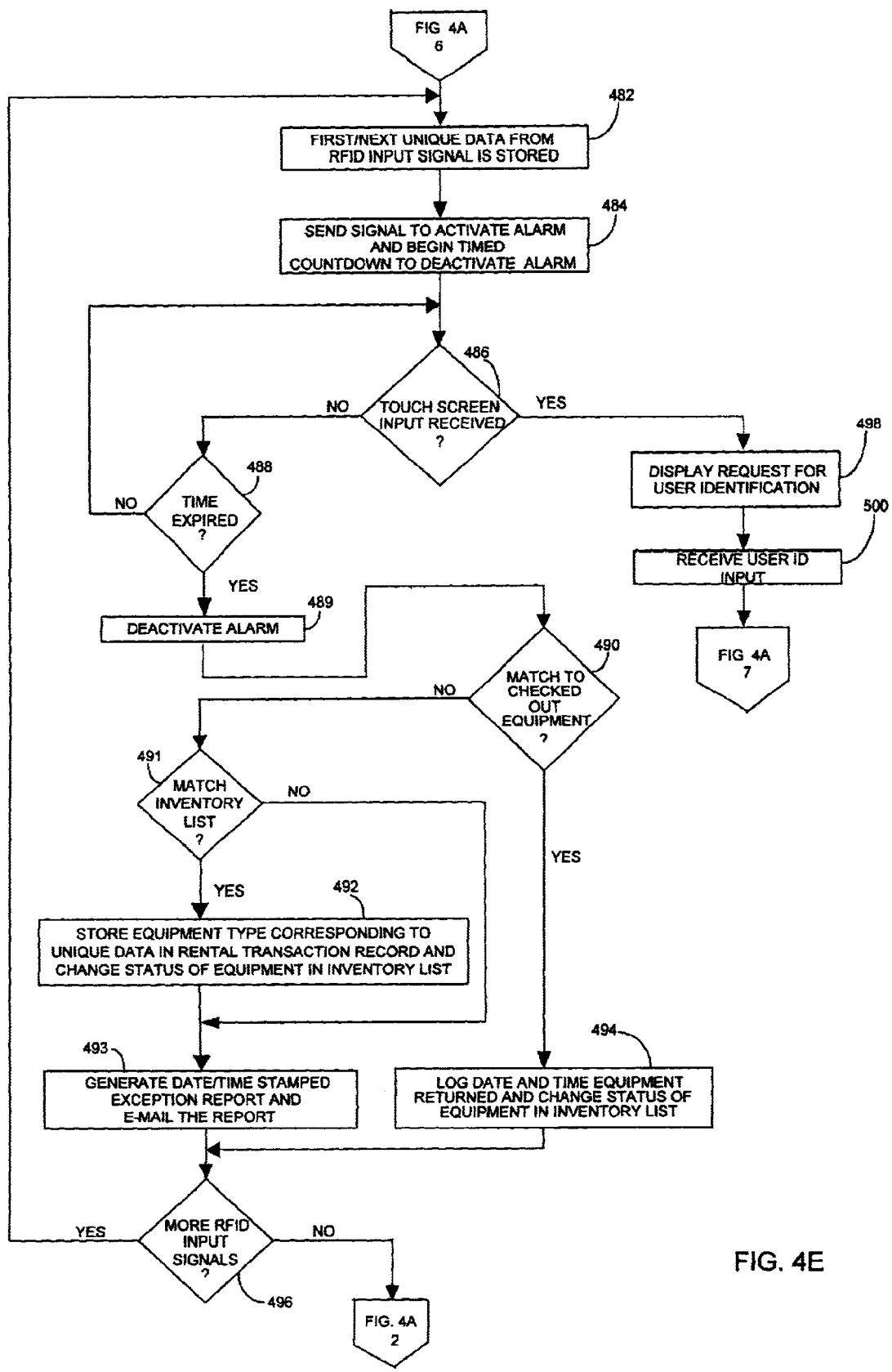
Figure 4F:
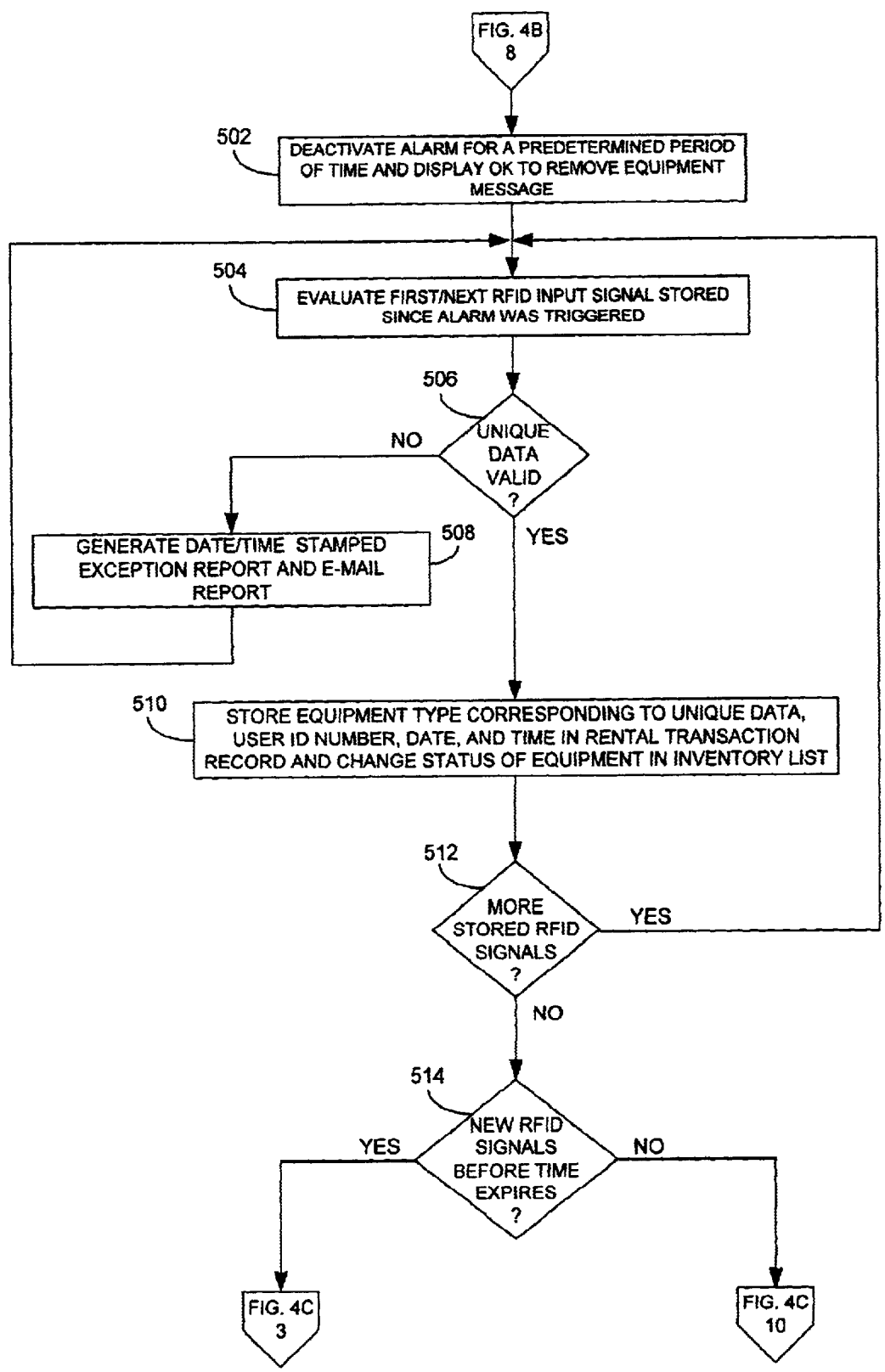

Referring now to FIG. 4C, in step 450, which flows from either step 448 of FIG. 4B or step 514 of FIG. 4F, a first RFID input signal is received by Antennas 216 as the first/next piece of audio visual equipment is removed from Automated Unmanned Rental Station 200 by the authorized user through Portal 220. Step 452 determines if the unique data interpreted from the RFID input signal is valid. For example, an invalid RFID input would occur if the third party provider delivered a new piece of equipment to the hotel for inclusion in their inventory, and the third party provider failed to update Inventory Database Module 338 through Equipment Rental Software 320 at the Unmanned Rental Site 106. Then, if that piece of equipment is removed from Automated Unmanned Rental Station 200, the unique data interpreted from the RFID input signal received by the RFID tracking system as it passed through Portal 220 would not match with any piece of equipment in the inventory database. Another example of invalid RFID input would occur if Inventory Database Module 338, when queried by Equipment Rental Software 320, indicates that a piece of equipment just removed is not supposed to be available in inventory, because its previous status is "checked out" and no record of it's status ever being changed to "checked in" was recorded. A defective or damaged RFID tag may also result in an invalid RFID input or no input at all.

If step 452 determines that the RFID input is invalid, then in step 454 Equipment Rental Software 320 generates a date and time stamped exception report and automatically e-mails the exception report to the hotel contact personnel at the Unmanned Rental Site 106 and to Central Rental Processing Center 102. Control then returns to step 450 for receiving a next RFID input signal.

If step 452 determines that the RFID input is valid, then in step 456 a rental transaction record is created, pulling the data from the inventory database corresponding to the unique data interpreted from the RFID input signal received and associating the equipment with the proper reference number and User ID Number. The date and time of this event and the days the equipment is to be checked out is also captured, and the item's status in the inventory list in Inventory Database Module 338 is changed from "checked in" to "checked out." The rental transaction record may be automatically transmitted to a predetermined location, such as the hotel contact personnel and/or Central Rental Processing Center 102 upon each occurrence, or stored in Computer System 214 and then transmitted in a batch file at a specified time.

Step 458 then determines if another RFID input signal is received before the predetermined period of time has expired. If yes, then control returns to step 450. If step 458 determines that the time period has expired, then in step 460 the alarm system is reactivated. In step 462 the User Interface Module 322 displays the "Begin Transaction" screen on Graphics Display 310. Control then flows to step 404 of FIG. 4A where Equipment Rental Software 320 determines if RFID input, touch screen input, or shut down input is received.

Referring now to FIG. 4D, step 464 flows from step 436 of FIG. 4B, where the alarm was not triggered or sounding when the "Return Equipment" input was received. In step 464 the alarm system is deactivated for a predetermined period of time to allow the authorized user to return audio visual equipment to Automated Unmanned Rental Station 200. Typical this predetermined period of time is between three to ten minutes, and is adjustable in system set up. An okay to return equipment message is displayed on Graphics Display 310.

In step 466 a first RFID input signal is received by Antennas 216 as the first piece of audio visual equipment is returned to Automated Unmanned Rental Station 200 by the authorized user through Portal 220. Step 468 compares the interpreted unique data from the RFID input signal received with the rental transaction records for the equipment in the inventory database whose status is "checked out." Step 470 determines if there is a match between the unique data interpreted from the RFID input signal and a piece of equipment in the inventory database whose status is "checked out." If step 470 determines that there is no match, then in step 472 Equipment Rental Software 320 generates a date and time stamped exception report and automatically e-mails the exception report to the hotel contact personnel at the Unmanned Rental Site 106 and to Central Rental Processing Center 102. Control then returns to step 466 for receiving a next RFID input signal.

If step 470 determines that there is a match between the unique data received and a piece of equipment in the inventory database whose status is "checked out", then in step 474 an entry is made electronically into a log indicating the date and time the equipment was returned, and the equipment's status in the inventory list in Inventory Database Module 338 is changed from "checked out" to "checked in." Step 476 then determines if another RFID input signal is received before the predetermined period of time has expired. If yes, then control returns to step 466. If step 476 determines that the time period has expired, then in step 478 the alarm system is reactivated. In step 480 the User Interface Module 322 displays the "Begin Transaction" screen on Graphics Display 310. Control then flows to step 404 of FIG. 4A where Equipment Rental Software 320 determines if RFID input, touch screen input, or shut down input is received.

Referring now to FIG. 4E, step 482 flows from step 404 of FIG. 4A, where Equipment Rental Software 320 determined that RFID input has been received. In this situation, equipment has passed through Portal 220 without an authorized user first logging into the system. An authorized user may be returning equipment and passed through Portal 220 with the equipment and will soon be logging into Equipment Rental Software 320. Or, an authorized user may be attempting to remove equipment and has forgotten to logon to Equipment Rental Software 320. Or, an unauthorized individual may be taking or returning equipment for valid or invalid reasons.

In step 482, the first unique data interpreted from the first RFID input signal received is stored. In step 484 Security Alarm Module 330 sends a triggering signal to activate Alarm 224 and begin a timed countdown to deactivate Alarm 224. Step 486 determines if touch screen input is received. If no touch screen input is received, then step 488 determines if the predetermined period of time has expired. If the predetermined period of time has not expired, control returns to step 486 to wait for touch screen input. If step 488 determines that the predetermined period of time has expired, the alarm is deactivated in step 489 and a check is done in step 490 to see if the stored interpreted unique data from the RFID input signal matches a piece of equipment in the inventory database whose status is "checked out." If there is no match, then step 491 checks to see if the stored interpreted unique data from the RFID input signal matches a piece of equipment in the inventory database marked as being in the inventory list. If not, control flows to step 493.

If a match is found in step 491, then in step 492 a rental transaction record is created, pulling the data from Inventory Database Module 338 corresponding to the unique data received. The status of the piece of equipment matching the data is changed in the inventory list in Inventory Database Module 338 from "checked in" to "checked out." The rental transaction record may be automatically transmitted to a predetermined location, such as the hotel contact personnel and/or Central Rental Processing Center 102 upon each occurrence, or stored in Computer System 214 and then transmitted in a batch file at a specified time.

In step 493, flowing from either from step 491 or step 492, Equipment Rental Software 320 generates a date and time stamped exception report and automatically e-mails the exception report to the hotel contact personnel at the Unmanned Rental Site 106 and to Central Rental Processing Center 102.

Step 496 determines if more RFID input signals have been received. If yes, control returns to step 482 for storing the next interpreted unique data from the RFID input signal received. If step 496 determines that no more RFID input signals have been received, then control flows to step 402 of FIG. 4A where the User Interface Module 322 displays the "Begin Transaction" screen on Graphics Display 310.

If step 490 determines that the unique data stored matches a piece of equipment in the inventory database whose status is "checked out", then in step 494 an entry is made into a log indicating the date and time the equipment was returned, and the status of the equipment in the inventory list of Inventory Database Module 338 is changed to "checked in". Control then flows to step 496 to determine if more RFID input signals have been received.

If step 486 determines that touch screen input is received, then step 498 displays a request for user identification message on Graphics Display 310. User identification input is received via User Identification Device 222 in step 500. Control then returns to step 412 of FIG. 4A to determine if the identification input is valid.

Referring now to FIG. 4F, step 502 flows from step 446 of FIG. 4B, where it was determined that the alarm was triggered when the "Check-Out Equipment" input was received. In step 502 the alarm system is deactivated for a predetermined period of time to allow the authorized user to remove audio visual equipment from Automated Unmanned Rental Station 200. Typically this predetermined period of time is between three to ten minutes, and is adjustable in system set up. An okay to remove equipment message is displayed on Graphics Display 310.

In step 504 the first RFID input signal stored since the alarm was triggered is interpreted. Step 506 determines if the interpreted unique data from the RFID input signal is valid. If it is not, then in step 508 Equipment Rental Software 320 generates a date and time stamped exception report and automatically e-mails the exception report to the hotel contact personnel at the Unmanned Rental Site 106 and to Central Rental Processing Center 102. Control then returns to step 504 where the next RFID input signal stored since the alarm was triggered is interpreted.

If step 506 determines that the RFID input signal is valid, then in step 510 a rental transaction record is created, pulling the information from Inventory Database Module 338 corresponding to the unique data received. The date and time of this event is also captured, and the status of the item in the inventory list in Inventory Database Module 338 is changed from "checked in" to "checked out." Step 512 then determines if there are any more RFID input signals that have been stored. If yes, control returns to step 504 where the next RFID input signal stored since the alarm was triggered is interpreted.

If step 512 determines that there is no more stored RFID input signals, then step 514 determines if any new RFID input signals are received before the predetermined period of time has expired. If yes, then control returns to step 450 of FIG. 4C, where a next RFID input signal is received by Antennas 216 as the next piece of audio visual equipment is removed from Automated Unmanned Rental Station 200 by the authorized user through Portal 220. If step 514 determines that no new RFID input signals have been received before the time period has expired, then control returns to step 460 of FIG. 4C, where the alarm system is reactivated.

Figure 4G:
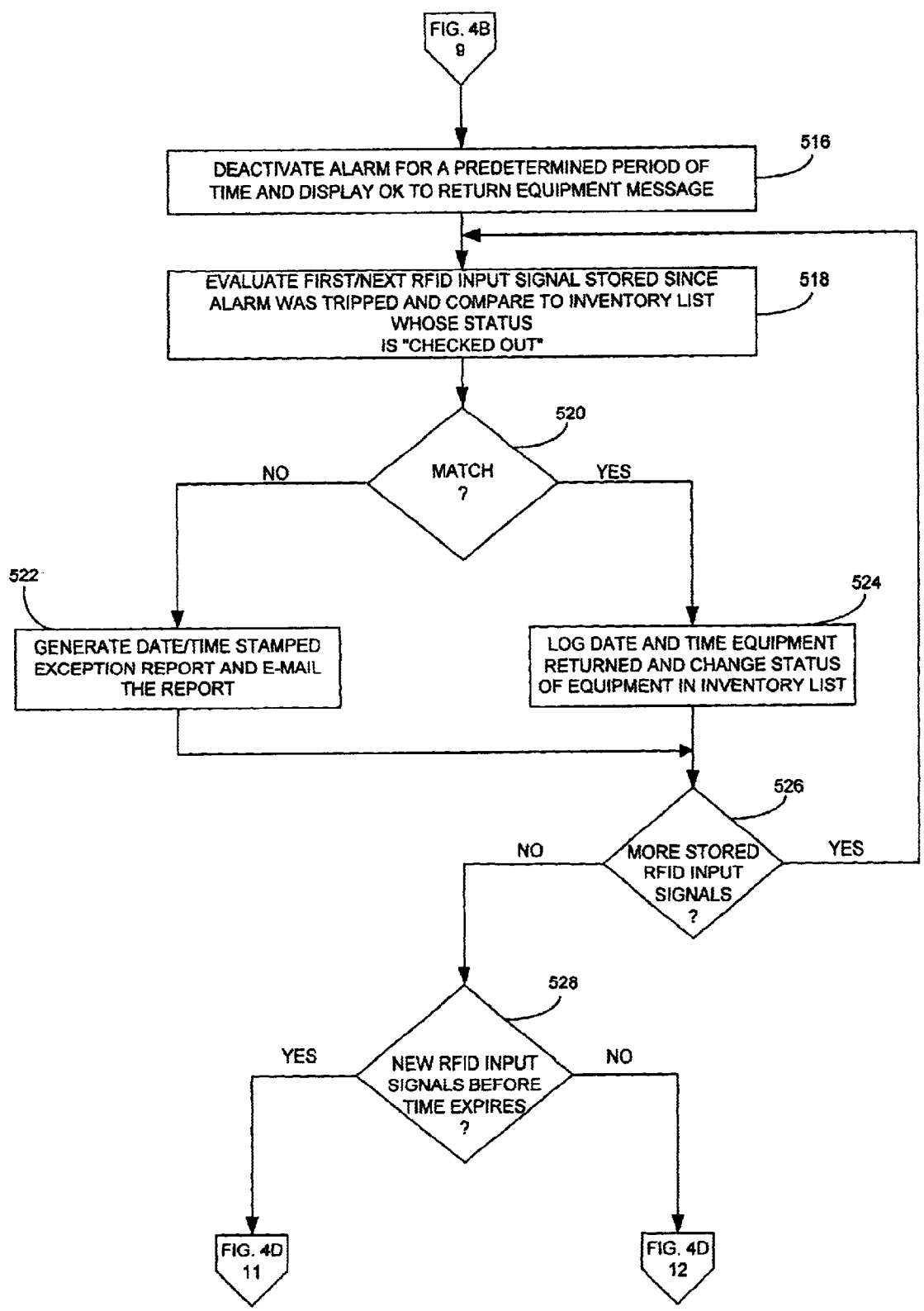

Referring now to FIG. 4G, step 516 flows from step 436 of FIG. 4B, where it was determined that the alarm was triggered when the "Return Equipment" input was received. In step 516 the alarm system is deactivated for a predetermined period of time to allow the authorized user to return audio visual equipment to Automated Unmanned Rental Station 200. Typically this predetermined period of time is between three to ten minutes, and is adjustable in system set up. An okay to return equipment message is displayed on Graphics Display 310.

In step 518 the first RFID input signal stored since the alarm was triggered is interpreted and compared with the equipment in the inventory list in Inventory Database Module 338 whose status is "checked out." Step 520 determines if there is a match between the unique data from the RFID input signal received and a piece of equipment in Inventory Database Module 338 whose status is "checked out." If step 520 determines that there is no match, then in step 522

Equipment Rental Software 320 generates a date and time stamped exception report and automatically e-mails the exception report to the hotel contact personnel at the Unmanned Rental Site 106 and to Central Rental Processing Center 102. Control then flows to step 526.

If step 520 determines that there is a match between the unique data received and a piece of equipment in the inventory database whose status is "checked out", then in step 524 an entry is made into a log indicating the date and time the equipment was returned, and the equipment's status in the inventory list in Inventory Database Module 338 is changed from "checked out" to "checked in."

Flowing from either step 522 or 524, step 526 determines if there is any more RFID input signals that have been stored. If yes, control returns to step 518 where the next RFID input signal stored since the alarm was triggered is interpreted and compared with the equipment in the inventory database whose status is "checked out."

If step 526 determines that there are no more stored RFID input signals, then step 528 determines if any new RFID input signals are received before the predetermined period of time has expired. If yes, then control returns to step 466 of FIG. 4D, where a next RFID input signal is received by Antennas 216 as the next piece of audio visual equipment is returned to Automated Unmanned Rental Station 200 by the authorized user through Portal 220. If step 528 determines that no new RFID input signals have been received before the time period has expired, then control returns to step 478 of FIG. 4D, where the alarm system is reactivated.

Figure 5:
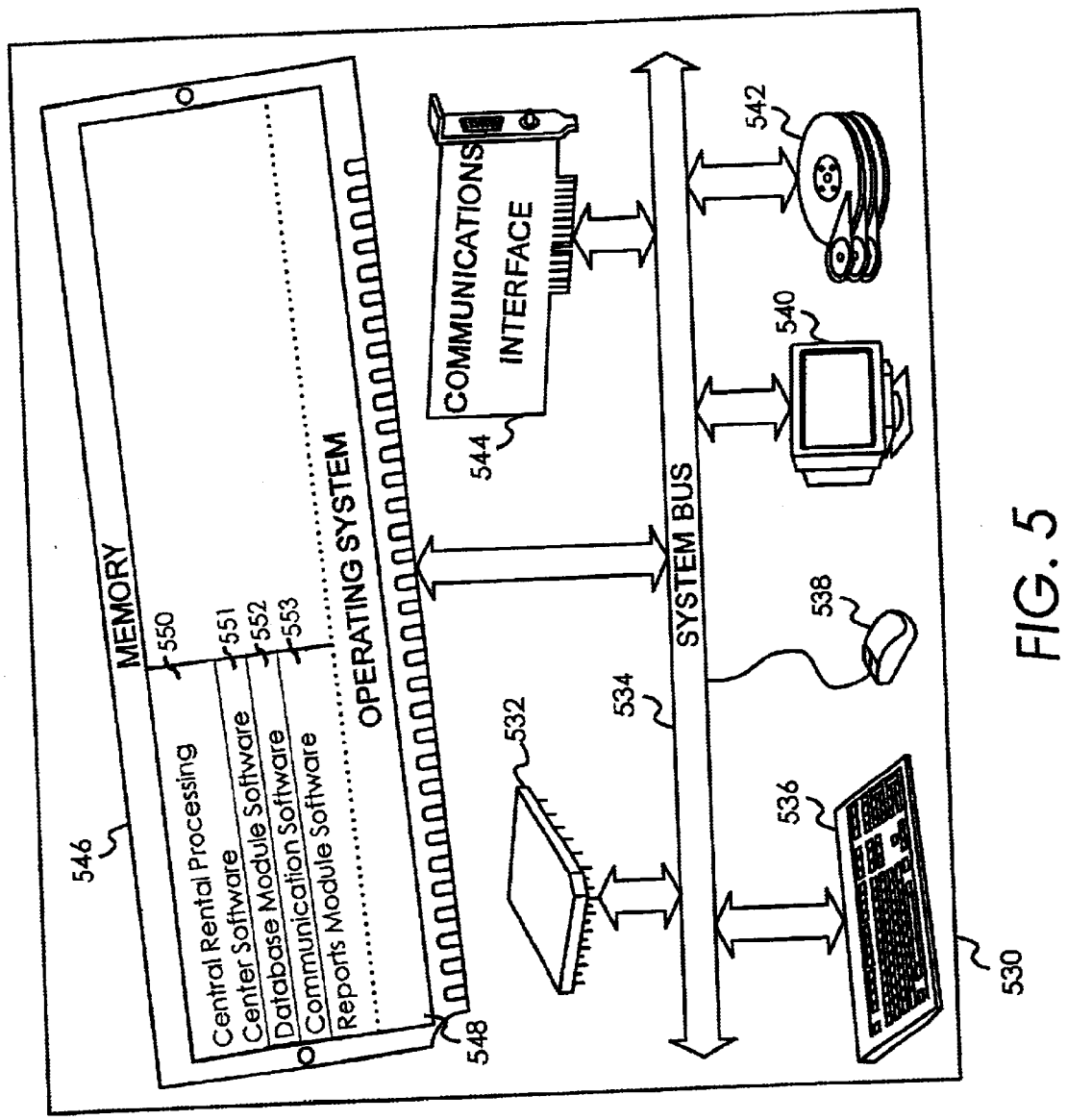
FIG. 5 shows a schematic/block diagram of the computer system of a central rental processing center of FIG. 1 incorporating an embodiment of an automated unmanned rental system of the present invention.

FIG. 5 shows a schematic/block diagram of the computer system of a central rental processing center of FIG. 1 incorporating an embodiment of an automated unmanned rental system of the present invention. The computer system may be a mainframe computer system, a stand alone personal computer system, or a networked distributed computer system. The computer system shown in FIG. 5 is an exemplary embodiment.

Referring now to FIG. 5, Central Rental Processing Center Computer System 530 contains a Processing Element 532. The Processing Element 532 communicates to other elements of the Central Rental Processing Center Computer System 530 over a System Bus 534. A Keyboard 536 allows a user to input information into Central Rental Processing Center Computer System 530, and a Graphics Display 540 allows Central Rental Processing Center Computer System 530 to output information to the user. Graphics Display 540 may also have a touch sensitive display screen, allowing a user to input information into Central Rental Processing Center Computer System 530 through the touch screen. A pointing device, such as Mouse 538, is also used to input information. A Storage Device 542 is used to store data and programs within Central Rental Processing Center Computer System 530.

A Memory 546, also attached to System Bus 534, contains an Operating System 548, Central Rental Processing Center Software 550, Database Module Software 551, Communication Software 552, and Reports Module Software 553. Central Rental Processing Center Software 550 controls the overall operation of Central Rental Processing Center Computer System 530. Database Module Software 551 stores in an organized and structured fashion the rental activity reported from each Unmanned Rental Site 106. Rental activity includes the individual data elements entered by the users, the system administrators, and by the interaction of the hardware and software as RFID tags are passed through the portal. The structure of the data also facilitates the generation of reports by Reports Module Software 553 by allowing specific individual data elements to be referenced. Reports Module Software 553 accesses, but does not amend, delete, or alter, the data elements in Database Module Software 551. Reports Module Software 553 may generate reports that include, but is not limited to, inventory data, rental order data, and user lists. Reports Module Software 553 allows the users and system administrators to manage the overall system by pooling and grouping individual data elements into an organized format. Simultaneously, multiple individual data elements may be extracted as requested by the users or system administrators from Database Module Software 551 for display on Graphics Display 540 or printed out on paper.

Communication Software 552 controls a Communications Interface 544, also attached to System Bus 534. Communications Interface 544 may have one or more serial ports, parallel ports, infrared ports, and the like. Connectable through Communications Interface 544 may be an external printer or scanner, as well as access to a computer network or to the Internet (not shown in FIG. 5). Communication Software 552 and Communications Interface 544 enable Central Rental Processing Center Computer System 530 to link with one or more Unmanned Rental Sites 106 each having a Computer System 214.

Figure 6:
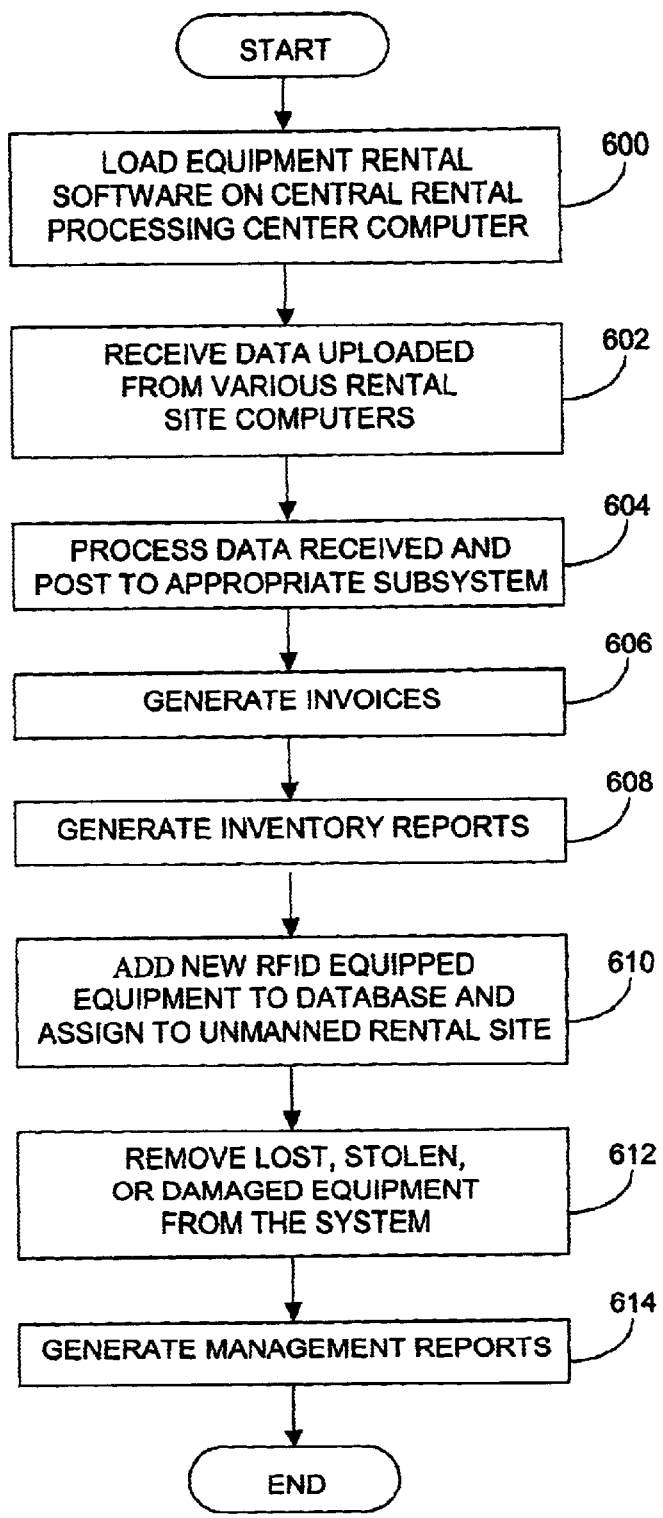
FIG. 6 shows a flow chart of a method of a central processing rental center in an embodiment of an automated unmanned rental system of the present invention.

FIG. 6 shows a flow chart of a method of a central processing rental center in an embodiment of an automated unmanned rental system of the present invention. Referring now to FIG. 6, in step 600 Central Rental Processing Center Software 550 is loaded onto Central Rental Processing Center Computer System 530 (FIG. 5) located in Central Rental Processing Center 102 (FIG. 1). In step 602, Central Rental Processing Center Computer System 530 begins receiving data via Communications Interface 544 from one or more Computer Systems 214 (FIG. 2) located at one or more Unmanned Rental Sites 106 (FIG. 1). This data includes daily rental activity and inventory status. Step 604 processes the data received and posts data, such as rental transactions and inventory status changes, to one or more subsystems. Subsystems may include, but are not limited to, an Accounting Subsystem and an Inventory Control Subsystem. The Accounting Subsystem, which in one embodiment of the invention is a separate computer package on a different computer system, may generate invoices once or more a month for the entire site. Inventory related data elements are combined for all remote locations in the Inventory Subsystem. The Inventory Subsystem allows reporting on a larger scale as compared to the Inventory Database Module 338 at each Unmanned Rental Site 106. The Inventory Subsystem may also allow for some manipulation of the data by administrators for management purposes.

In step 606, Central Rental Processing Center Software 550 may generate invoices for the rental activity if invoices are not generated at each Unmanned Rental Site 106. In step 608 Central Rental Processing Center Software 550 may generate inventory reports for each Unmanned Rental Site 106. In step 610 additional equipment having an RFID tag is entered into the inventory database and assigned to one of the Unmanned Rental Sites 106. The equipment will then be delivered to the Unmanned Rental Sites 106 as needed. In step 612 lost, stolen, or damaged equipment that is no longer suitable for renting is removed from the inventory database. Finally, in step 614, various management reports may be generated regarding various aspects of the rental activity associated with the Unmanned Rental Sites 106. The management reports may be run for each individual Unmanned Rental Site 106, combined by region, or system wide.

Figure 7:
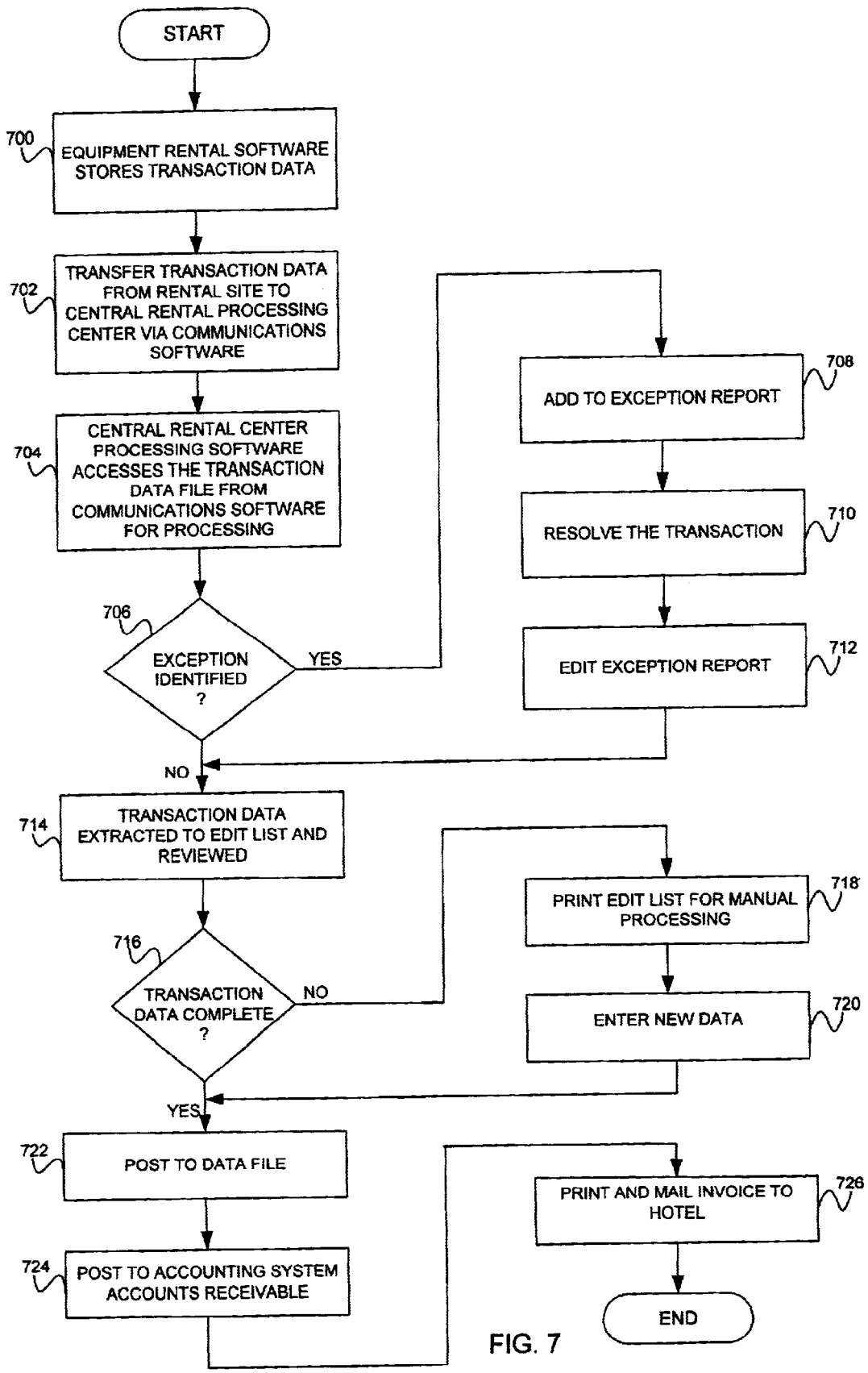
FIG. 7 shows a flow chart of a method of the billing process in an embodiment of an automated unmanned rental system of the present invention.

FIG. 7 shows a flow chart of a method of the billing process in an embodiment of an automated unmanned rental system of the present invention. Referring now to FIG. 7, in step 700 Equipment Rental Software 320 stores transaction data captured through rental activity, as described above, in a transaction data file. Periodically, in step 702, the stored transaction data file is transferred from Computer System 214 at an Unmanned Rental Site 106 to Central Rental Processing Center Computer System 530 at Central Rental Processing Center 102. This transfer is controlled by Communication Module 334 and corresponding Communication Software 552 loaded onto Central Rental Processing Center Computer System 530. In one embodiment of the invention, Communication Module 334 and the Communication Software 552 loaded onto Central Rental Processing Center Computer System 530 is a third party software product called Remote Ware by Xcellenet. Any other suitable communications package may also be used.

In step 704 Central Rental Processing Center Software 550 accesses the transaction data file from the communication software for processing. For each transaction in the transaction data file, Central Rental Processing Center Software 550 determines in step 706 if there is any data missing associated with the transaction that would cause it to be an exception. If no, control flows to step 714. If yes, the transaction is extracted to an exception report in step 708. In step 710 a user resolves the problem transactions and secures the missing data, such as a valid User ID Number. This may entail making phone calls to the hotel contact personnel at the Unmanned Rental Site 106, or other appropriate means. Once resolved, in step 712 the user edits the exception report to reflect the corrected data for the transaction, and the edited exception report is returned for further processing by Central Rental Processing Center Software 550 in step 714.

In step 714 the transaction data is extracted to an edit list and reviewed by the user. The user determines in step 716 if each transaction has complete data. If yes, control flows to step 722. If not, in step 718 the edit list is printed for manual processing by the user. This may entail making phone calls to the hotel contact personnel at the Unmanned Rental Site 106, or other appropriate means. Once resolved, in step 720 the user enters any new data into the edit list that was missing, and the edited list of transaction data is posted to a post processed data file in step 722. This data file is posted in step 724 to the accounting system software accounts receivables. The accounting system software may reside on Central Rental Processing Center Computer System 530 or on a different computer system. In step 726 invoices for each rental transaction are printed and mailed to the proper hotel, and the billing method of the present invention ends.

Having described different embodiments of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A method for an automated unmanned rental station for use in cooperation with a plurality of pieces of rental equipment stored in the automated unmanned rental station, each of the plurality of pieces of rental equipment having a radio frequency identification tag attached thereto, the method comprising:

(a) receiving user input through a user interface of a computer system associated with the automated unmanned rental station;

(b) receiving in an antenna in communication with said computer system, and located near a portal of the automated unmanned rental station, a first radio frequency identification signal from a first one of the plurality of pieces of rental equipment having a radio frequency identification tag moved through said portal;

(c) creating a first rental transaction record for said first one of the plurality of pieces of rental equipment moved through said portal utilizing data from an inventory database stored in said computer system that matches a first unique data interpreted from said first radio frequency identification signal; and (d) altering a status in said inventory database of said first one of the plurality of pieces of rental equipment.

2. A method according to claim 1 further comprising:
receiving a user identification input through said user interface of said computer system.

3. A method according to claim 1 wherein said user interface of said computer system comprises at least one of a keyboard, a mouse, a voice command interpreted through speech recognition, a barcode reader, and a touch screen of a graphics display.

4. A method according to claim 1 further comprising:
determining the validity of said user identification input.

5. A method according to claim 4 further comprising:
when said user identification input is determined to be invalid, generating electronically an exception report having a date and time stamp; and
sending automatically said exception report electronically to at least one predetermined location.

6. A method according to claim 1 further comprising:
receiving a check-out equipment input through said user interface.

7. A method according to claim 6 further comprising:
receiving a reference number input through said user interface; and
receiving a number of days input through said user interface.

8. A method according to claim 6 further comprising:
deactivating an alarm component of said computer system for a predetermined period of time after receiving said check-out equipment input.

9. A method according to claim 8 further comprising:
when said predetermined period of time has expired, reactivating said alarm component of said computer system.

10. A method according to claim 1 further comprising:
transmitting automatically said first rental transaction record from said computer system to at least one predetermined location.

11. A method according to claim 1 further comprising:
storing said first rental transaction record in said computer system; and
transmitting said first rental transaction record from said computer system to at least one predetermined location at a specified time.

12. A method according to claim 1 further comprising:
determining the validity of said first unique data.

13. A method according to claim 12 further comprising:
when said first unique data is determined to be invalid, generating electronically an exception report having a date and time stamp; and sending automatically said exception report electronically to at least one predetermined location.

14. A method according to claim 1 wherein said first rental transaction record contains at least one of an equipment type, a reference number, a user identification number, a number of days checked out, a date, and a time.

15. A method according to claim 1 wherein said altered status in said inventory database of said first one of the plurality of pieces of rental equipment indicates that said first one of the plurality of pieces of rental equipment is checked out.

16. A method according to claim 1 further comprising:

repeating acts (b) through (d) for a second unique data interpreted from a second radio frequency identification signal from a second one of the plurality of pieces of rental equipment moved through said portal, wherein a second rental transaction record is created and a status in said inventory database of said second one of the plurality of pieces of rental equipment is altered.

17. A method according to claim 1 further comprising:

generating an invoice with said computer system based on said first rental transaction record.

18. A method for an automated unmanned rental station for use in cooperation with a plurality of pieces of rental equipment stored in the automated unmanned rental station, each of the plurality of pieces of rental equipment having a radio frequency identification tag attached thereto, the method comprising:

(a) receiving user input through a user interface of a computer system associated with the automated unmanned rental station;

(b) receiving in an antenna in communication with said computer system, and located near a portal of the automated unmanned rental station, a first radio frequency identification signal from a first one of the plurality of pieces of rental equipment having the radio frequency identification tag moved through said portal;

(c) comparing a first unique data interpreted from said first radio frequency identification signal for said first one of the plurality of pieces of rental equipment moved through said portal to a plurality of rental transaction records in an inventory database stored in said computer system that matches said first unique data; and (d) altering a status in said inventory database of said first one of the plurality of pieces of rental equipment.

19. A method according to claim 18 further comprising:

receiving a user identification input through said user interface of said computer system.

20. A method according to claim 18 wherein said user interface of said computer system comprises at least one of a keyboard, a mouse, a voice command interpreted through speech recognition, a barcode reader, and a touch screen of a graphics display.

21. A method according to claim 18 further comprising:

determining the validity of said user identification input.

22. A method according to claim 21 further comprising:

when said user identification input is determined to be invalid, generating electronically an exception report having a date and time stamp; and sending automatically said exception report electronically to at least one predetermined location.

23. A method according to claim 18 further comprising:

receiving a return equipment input through said user interface.

24. A method according to claim 23 further comprising:

deactivating an alarm component of said computer system for a predetermined period of time after receiving said return equipment input.

25. A method according to claim 24 further comprising:

when said predetermined period of time has expired, reactivating said alarm component of said computer system.

26. A method according to claim 18 further comprising:

when said first unique data does not match at least one of said plurality of rental transaction records in said inventory database stored in said computer system, generating electronically an exception report having a date and time stamp; and sending automatically said exception report electronically to at least one predetermined location.

27. A method according to claim 18 wherein said altered status in said inventory database of said first one of the plurality of pieces of rental equipment indicates that said first one of the plurality of pieces of rental equipment is checked in.

28. A method according to claim 27 further comprising:

entering electronically into a log a date and time said altered status of said first one of the plurality of pieces of rental equipment is indicated as checked in.

29. A method according to claim 27 further comprising:

generating an invoice with said computer system when said altered status in said inventory database of said first one of the plurality of pieces of rental equipment indicates that said first one of the plurality of pieces of rental equipment is checked in.

30. A method according to claim 18 further comprising:

repeating acts (b) through (d) for a second unique data interpreted from a second radio frequency identification signal from a second one of the plurality of pieces of rental equipment moved through said portal, wherein said second unique data is compared to said plurality of rental transaction records in said inventory database stored in said computer system and a status in said inventory database of said second one of the plurality of pieces of rental equipment is altered.

31. A method for an automated unmanned rental station for use in cooperation with a plurality of pieces of rental equipment stored in the automated unmanned rental station, each of the plurality of pieces of rental equipment having a radio frequency identification tag attached thereto, the method comprising:

(a) receiving in an antenna in communication with a computer system associated with the automated unmanned rental station, and located near a portal of the automated unmanned rental station, a first radio frequency identification signal from a first one of the plurality of pieces of rental equipment having a radio frequency identification tag moved through said portal;

(b) comparing a first unique data interpreted from said first radio frequency identification signal for said first one of the plurality of pieces of rental equipment moved through said portal to a plurality of rental transaction records in an inventory database stored in said computer system that matches said first unique data; and (c) altering a status in said inventory database of said first one of the plurality of pieces of rental equipment.

32. A method according to claim 31 further comprising:

activating an alarm component of said computer system after receiving said first unique data; and beginning a timed countdown for a predetermined period of time for said alarm component to sound.

33. A method according to claim 32 further comprising:

deactivating said alarm component of said computer system when said predetermined period of time expires.

34. A method according to claim 31 wherein said altered status in said inventory database of said first one of the plurality of pieces of rental equipment indicates that said first one of the plurality of pieces of rental equipment is checked in.

35. A method according to claim 34 further comprising:

entering electronically into a log a date and time said altered status of said first one of the plurality of pieces of rental equipment is indicated as checked in.

36. A method according to claim 34 further comprising:

generating an invoice with said computer system when said altered status in said inventory database of said first one of the plurality of pieces of rental equipment indicates that said first one of the plurality of pieces of rental equipment is checked in.

37. A method according to claim 31 further comprising:

when said first unique data does not match at least one of said plurality of rental transaction records in said inventory database stored in said computer system, generating electronically an exception report having a date and time stamp; and sending automatically said exception report electronically to at least one predetermined location.

38. A method according to claim 31 further comprising:

repeating acts (a) through (c) for a second radio frequency identification signal from a second one of the plurality of pieces of rental equipment moved through said portal, wherein said second radio frequency identification signal is compared to said plurality of rental transaction records in said inventory database stored in said computer system and a status in said inventory database of said second one of the plurality of pieces of rental equipment is altered.

39. A method for an automated unmanned rental station for use in cooperation with a plurality of pieces of rental equipment stored in the automated unmanned rental station, each of the plurality of pieces of rental equipment having a radio frequency identification tag attached thereto, the method comprising:

(a) receiving in an antenna in communication with a computer system associated with the automated unmanned rental station, and located near a portal of the automated unmanned rental station, a first radio frequency identification signal from a first one of the plurality of pieces of rental equipment having the radio frequency identification tag moved through said portal;

(b) comparing a first unique data interpreted from said first radio frequency identification signal for said first one of the plurality of pieces of rental equipment moved through said portal to an inventory list of a plurality of pieces of rental equipment in an inventory database stored in said computer system that matches said first unique data; and (c) creating a first rental transaction record for said first one of the plurality of pieces of rental equipment moved through said portal utilizing data from said inventory database stored in said computer system that matches said first unique data; and (d) altering a status in said inventory database of said first one of the plurality of pieces of rental equipment.

40. A method according to claim 39 further comprising:

activating an alarm component of said computer system after receiving said first unique data; and beginning a timed countdown for a predetermined period of time for said alarm component to sound.

41. A method according to claim 40 further comprising:

deactivating said alarm component of said computer system when said predetermined period of time expires.

42. A method according to claim 39 wherein said altered status in said inventory database of said first one of the plurality of pieces of rental equipment indicates that said first one of the plurality of pieces of rental equipment is checked out.

43. A method according to claim 42 further comprising:

generating an invoice with said computer system based on said first rental transaction record.

44. A method according to claim 39 further comprising:

transmitting automatically said first rental transaction record from said computer system to at least one predetermined location.

45. A method according to claim 39 further comprising:

storing said first rental transaction record in said computer system; and transmitting said first rental transaction record from said computer system to at least one predetermined location at a specified time.

46. A method according to claim 39 further comprising:

when said first unique data does not match at least one of said plurality of pieces of rental equipment in said inventory list in said inventory database stored in said computer system, generating electronically an exception report having a date and time stamp; and sending automatically said exception report electronically to at least one predetermined location.

47. A method according to claim 39 further comprising:

repeating acts (a) through (d) for a second unique data interpreted from a second radio frequency identification signal from a second one of the plurality of pieces of rental equipment moved through said portal, wherein said second unique data is compared to said plurality of pieces of rental equipment in said inventory list in said inventory database stored in said computer system and a second rental transaction record is created and a status in said inventory database of said second one of the plurality of pieces of rental equipment is altered.

48. A method according to claim 39 wherein said first rental transaction record contains at least one of an equipment type, a date, and a time.

49. A method for an automated unmanned rental station for use in cooperation with a plurality of pieces of rental equipment stored in the automated unmanned rental station, each of the plurality of pieces of rental equipment having a radio frequency identification tag attached thereto, the method comprising:

(a) receiving in an antenna in communication with a computer system associated with the automated unmanned rental station, and located near a portal of the automated unmanned rental station, a first radio frequency identification signal from a first one of the plurality of pieces of rental equipment moved through said portal;

(b) receiving a user identification input through a user interface of said computer system;

(c) comparing a first unique data interpreted from said first radio frequency identification signal for said first one of the plurality of pieces of rental equipment moved through said portal to a plurality of rental transaction records in an inventory database stored in said computer system that matches said first unique data; and (d) altering a status of said first one of the plurality of pieces of rental equipment in said inventory database.

50. A method according to claim 49 further comprising:
determining the validity of said user identification input.

51. A method according to claim 50 further comprising:
when said user identification input is determined to be invalid, generating electronically an exception report having a date and time stamp; and
sending automatically said exception report electronically to at least one predetermined location.

52. A method according to claim 49 wherein said user interface of said computer system comprises at least one of a keyboard, a mouse, a voice command interpreted through speech recognition, a barcode reader, and a touch screen of a graphics display.

53. A method according to claim 49 further comprising:
activating an alarm component of said computer system after receiving said first unique data; and
beginning a timed countdown for a first predetermined period of time for said alarm component to sound.

54. A method according to claim 53 further comprising:
receiving a return equipment input through said user interface of said computer system.

55. A method according to claim 54 further comprising:
deactivating said alarm component of said computer system for a second predetermined period of time after receiving said return equipment input through said user interface of said computer system.

56. A method according to claim 55 further comprising:
storing in said computer system said first unique data.

57. A method according to claim 56 further comprising:
repeating acts (c) and (d) for a second unique data interpreted from a second radio frequency identification signal stored in said computer system from a second one of the plurality of pieces of rental equipment moved through said portal, wherein said second unique data is compared to said plurality of rental transaction records in said inventory database stored in said computer system and a status in said inventory database of said second one of the plurality of pieces of rental equipment is altered.

58. A method according to claim 55 further comprising:
when said second predetermined period of time has expired, reactivating said alarm component of said computer system.

59. A method according to claim 55 further comprising:
when a second unique data interpreted from a second radio frequency identification signal from a second one of the plurality of pieces of rental equipment moved through said portal is received before said second predetermined period of time has expired, repeating acts (c) and (d) for said second unique data, wherein said second unique data is compared to said plurality of rental transaction records in said inventory database stored in said computer system and a status in said inventory database of said second one of the plurality of pieces of rental equipment is altered.

60. A method according to claim 49 wherein said user interface of said computer system comprises at least one of a keyboard, a mouse, a voice command interpreted through speech recognition, a barcode reader, and a touch screen of a graphics display.

61. A method according to claim 49 wherein said altered status in said inventory database of said first one of the plurality of pieces of rental equipment indicates that said first one of the plurality of pieces of rental equipment is checked in.

62. A method according to claim 61 further comprising:
generating an invoice with said computer system when said altered status in said inventory database of said first one of the plurality of pieces of rental equipment indicates that said first one of the plurality of pieces of rental equipment is checked in.

63. A method according to claim 61 further comprising:
entering electronically into a log a date and time said altered status of said first one of the plurality of pieces of rental equipment is indicated as checked in.

64. A method according to claim 49 wherein said plurality of rental transaction records further comprise an inventory list of a plurality of pieces of rental equipment having a status indicating that said plurality of pieces of rental equipment are checked out.

65. A method for an automated unmanned rental station for use in cooperation with a plurality of pieces of rental equipment stored in the automated unmanned rental station, each of the plurality of pieces of rental equipment having a radio frequency identification tag attached thereto, the method comprising:

(a) receiving in an antenna in communication with a computer system associated with the automated unmanned rental station, and located near a portal of the automated unmanned rental station, a first radio frequency identification signal from a first one of the plurality of pieces of rental equipment moved through said portal;

(b) receiving a user identification input through a user interface of said computer system;

(c) receiving a check-out equipment input through said user interface of said computer system; and (d) creating a first rental transaction record for said first one of the plurality of pieces of rental equipment moved through said portal utilizing data from said inventory database stored in said computer system that matches a first unique data interpreted from said first radio frequency identification signal; and (e) altering a status of said first one of the plurality of pieces of rental equipment in an inventory database stored in said computer system.

66. A method according to claim 65 further comprising:
determining the validity of said user identification input.

67. A method according to claim 66 further comprising:
when said user identification input is determined to be invalid, generating electronically an exception report having a date and time stamp; and
sending automatically said exception report electronically to at least one predetermined location.

68. A method according to claim 65 further comprising:
receiving a reference number input through said user interface; and
receiving a number of days input through said user interface.

69. A method according to claim 65 further comprising:
activating an alarm component of said computer system after receiving said first unique data; and
beginning a timed countdown for a first predetermined period of time for said alarm component to sound.

70. A method according to claim 69 further comprising:
deactivating said alarm component of said computer system for a second predetermined period of time after receiving said check-out equipment input through said user interface.

71. A method according to claim 70 further comprising:
when said second predetermined period of time has expired, reactivating said alarm component of said computer system.

72. A method according to claim 70 further comprising:
when a second unique data interpreted from a second radio frequency identification signal from a second one of the plurality of pieces of rental equipment moved through said portal is received before said second predetermined period of time has expired, repeating acts (d) and (e) for said second unique data, wherein a status in said inventory database of said second one of the plurality of pieces of rental equipment is altered.

73. A method according to claim 70 further comprising:
storing in said computer system said first unique data.

74. A method according to claim 65 further comprising:
determining the validity of said first unique data.

75. A method according to claim 74 further comprising:
when said first unique data is determined to be invalid, generating electronically an exception report having a date and time stamp; and
sending automatically said exception report electronically to at least one predetermined location.

76. A method according to claim 65 wherein said first rental transaction record contains at least one of an equipment type, a user reference number, a user identification number, a number of days checked out, a date, and a time.

77. A method according to claim 65 further comprising:
repeating acts (d) and (e) for a second unique data interpreted from a second radio frequency identification signal stored in said computer system from a second one of the plurality of pieces of rental equipment moved through said portal, wherein a status in said inventory database of said second one of the plurality of pieces of rental equipment is altered.

78. A method according to claim 65 wherein said user interface of said computer system comprises at least one of a keyboard, a mouse, a voice command interpreted through speech recognition, a barcode reader, and a touch screen of a graphics display.

79. A method according to claim 65 wherein said altered status in said inventory database of said first one of the plurality of pieces of rental equipment indicates that said first one of the plurality of pieces of rental equipment is checked out.

80. A method according to claim 65 further comprising:
generating an invoice with said computer system based on said first rental transaction record.

81. An automated unmanned rental station for use in cooperation with a plurality of pieces of rental equipment stored in the automated unmanned rental station, each of the plurality of pieces of rental equipment having a radio frequency identification tag attached thereto, the automated unmanned rental station comprising:
at least one antenna for tracking the movement of the plurality of pieces of rental equipment through a portal of the automated unmanned rental station, wherein said at least one antenna receives a radio frequency identification signal for each of the plurality of pieces of rental equipment having the attached radio frequency identification tag when moved through said portal; and
a computer system in communication with said at least one antenna, said computer system having a user interface for allowing interaction between at least one user and an equipment rental software loaded into a memory of said computer system, said equipment rental software further comprising,
a radio frequency identification tracking module for interpreting a unique data from each of said radio frequency identification signals received by said at least one antenna,
an inventory database module for storing a data on each of the plurality of pieces of rental equipment, wherein each of said unique data corresponds to a one of said data for a one of said plurality of pieces of rental equipment, and
a reporting module for generating at least one report regarding a rental activity of the plurality of pieces of rental equipment.

82. An automated unmanned rental station according to claim 81 further comprising:
a user identification device;
an alarm for generating audible sound; and
said equipment rental software further comprises,
a security alarm module for controlling said alarm,
a user identification module for receiving input from said at least one user through said user identification device and for authenticating said at least one user,
an automated billing module for generating at least one invoice based on said rental activity of the plurality of pieces of rental equipment, and
a communication module for transferring said at least one report regarding said rental activity of the plurality of pieces of rental equipment to at least one external location.

83. An automated unmanned rental station according to claim 81 wherein said user interface of said computer system comprises at least one of a keyboard, a mouse, a voice command interpreted through speech recognition, a barcode reader, and a touch screen of a graphics display, and further wherein said equipment rental software further comprises a user interface module for controlling the interaction between said at least one user and said equipment rental software.

84. An automated unmanned rental station according to claim 81 wherein when a first one of the plurality of pieces of rental equipment is moved through said portal, a first rental transaction record is created.

85. An automated unmanned rental station according to claim 81 wherein said portal is one of a doorway, a gate, or a pass through opening.

86. An automated unmanned rental system, the system comprising:
at least one unmanned rental site, said at least one unmanned rental site further comprising,
a plurality of pieces of rental equipment stored in an automated unmanned rental station located at said at least one unmanned rental site, wherein each of the plurality of pieces of rental equipment has a radio frequency identification tag attached thereto,
at least one antenna for tracking the movement of the plurality of pieces of rental equipment through a portal of the automated unmanned rental station, wherein said at least one antenna receives a radio frequency identification signal for each of the plurality of pieces of rental equipment having the attached radio frequency identification tag when moved through said portal, and a computer system in communication with said at least one antenna, said computer system having a user interface for allowing interaction between at least one user and an equipment rental software loaded into a memory of said computer system;

a central rental processing center, said central rental processing center further comprising a central rental processing center computer system having a central rental processing center software loaded into a memory of said central rental processing center computer system; and a communications medium for allowing communication between said computer system at said at least one unmanned rental site and said central rental processing center computer system at said central rental processing center, wherein said central rental processing center computer system at said central rental processing center receives over said communications medium at least one report regarding a rental activity generated by said computer system at said at least one unmanned rental site.

87. An automated unmanned rental system according to claim 86 wherein said equipment rental software further comprises:

a radio frequency identification tracking module for interpreting said unique signals received from said at least one antenna;

an inventory database module for storing a data on each of the plurality of pieces of rental equipment, wherein each of said unique data corresponds to a one of said data for a one of said plurality of pieces of rental equipment; and a reporting module for generating said at least one report regarding said rental activity from said at least one unmanned rental site.

88. An automated unmanned rental system according to claim 86 wherein said central rental processing center computer system at said central rental processing center receives over said communications medium at least one exception report regarding a rental activity generated by said computer system at said at least one unmanned rental site.

89. An automated unmanned rental system according to claim 86 wherein said central rental processing center computer system generates at least one invoice for said rental activity of said at least one report.

90. An automated unmanned rental system according to claim 86 wherein said communications medium is one of an intranet, the Internet, a LAN, a WAN, a wireless communication network, and a satellite communication network.

91. An automated unmanned rental system according to claim 86 wherein said at least one unmanned rental site further comprises:

a user identification device;

an alarm for generating audible sound; and said equipment rental software further comprises, a security alarm module for controlling said alarm, a user identification module for receiving input from said at least one user through said user identification device and for authenticating said at least one user, and a communication module for transferring said at least one report regarding said rental activity to said central rental processing center computer system at said central rental processing center.

92. An automated unmanned rental system according to claim 86 wherein said user interface of said computer system comprises at least one of a keyboard, a mouse, a voice command interpreted through speech recognition, a barcode reader, and a touch screen of a graphics display, and further wherein said equipment rental software further comprises a user interface module for controlling the interaction between said at least one user and said equipment rental software.

93. An automated unmanned rental system according to claim 86 wherein said portal is one of a doorway, a gate, or a pass through opening.

94. A method for an automated unmanned rental system for use in cooperation with at least one unmanned rental site having a plurality of pieces of rental equipment, wherein each of the plurality of pieces of rental equipment has a radio frequency identification tag attached thereto, the method comprising:

(a) loading a central rental processing center software on a central rental processing center computer;

(b) receiving in said central rental processing center computer a plurality of data uploaded from the at least one unmanned rental site;

(c) processing said plurality of data and posting a portion of said plurality of data to at least one subsystem;

(d) adding at least one additional piece of equipment having a radio frequency identification tag attached thereto to an inventory database, and assigning said at least one additional piece of equipment to a one of the at least one unmanned rental site;

(e) removing at least one of the plurality of pieces of rental equipment having a radio frequency identification tag attached thereto from said inventory database; and (f) generating at least one management report based on said plurality of data uploaded from the at least one unmanned rental site.

95. A method according to claim 94 wherein said at least one subsystem is an accounting subsystem and further comprising:

generating at least one invoice based on said portion of said plurality of data posted to said accounting subsystem.

96. A method according to claim 94 wherein said at least one subsystem is an inventory subsystem and further comprising:

generating at least one inventory report based on said portion of said plurality of data posted to said inventory subsystem.

97. A method according to claim 94 wherein said plurality of data further comprises transaction data stored in a transaction data file captured by a computer system at the at least one unmanned rental site.

98. A method according to claim 97 wherein said plurality of data is uploaded from the at least one unmanned rental site to said central rental processing center computer under the control of a communication software loaded on said central rental processing center computer and loaded on said computer system at the at least one unmanned rental site.

99. A method according to claim 97 wherein said processing act further comprises:

determining if a first transaction data in said transaction data file has a missing data;

when said transaction data file has said missing data, extracting said first transaction data into an exception report; and when said transaction data file has no said missing data, extracting said first transaction data into an edit list.

100. A method according to claim 94 further comprising:

repeating acts (b) and (c) for a next plurality of data uploaded from the at least one unmanned rental site, processing said next plurality of data, and posting a portion of said next plurality of data to said at least one subsystem.

101. A method according to claim 94 further comprising:

repeating acts (d) and (e) for adding a plurality of additional pieces of equipment to said inventory database, and for removing a plurality of pieces of rental equipment from said inventory database.

* * * * *